US010726715B2

(12) United States Patent
Hwang et al.

(10) Patent No.: US 10,726,715 B2
(45) Date of Patent: Jul. 28, 2020

(54) ELECTRONIC DEVICE AND METHOD FOR PERFORMING OPERATIONS ACCORDING TO PROXIMITY OF EXTERNAL OBJECT

(71) Applicant: Samsung Electronics Co., Ltd, Gyeonggi-do (KR)

(72) Inventors: Ho-Chul Hwang, Gyeonggi-do (KR); Moon-Soo Kim, Seoul (KR); Dong-Ho Jang, Gyeonggi-do (KR); Min-Jung Kim, Gyeonggi-do (KR); Yo-Han Lee, Gyeonggi-do (KR); Chi-Hyun Cho, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 182 days.

(21) Appl. No.: 15/350,005

(22) Filed: Nov. 11, 2016

(65) Prior Publication Data

US 2017/0140644 A1    May 18, 2017

(30) Foreign Application Priority Data

Nov. 12, 2015   (KR) .......................... 10-2015-0159236

(51) Int. Cl.
*G05B 23/02* (2006.01)
*G08C 17/02* (2006.01)
(Continued)

(52) U.S. Cl.
CPC ............ *G08C 17/02* (2013.01); *G06F 3/0304* (2013.01); *G06F 3/0346* (2013.01); *G06F 3/041* (2013.01);
(Continued)

(58) Field of Classification Search
CPC ...... G06F 3/0304; G06F 3/0346; G06F 3/041; G06F 3/16; G08C 17/02; G08C 2201/91; G08C 2201/93
(Continued)

(56) References Cited

U.S. PATENT DOCUMENTS

2006/0197860 A1    9/2006  Kim et al.
2008/0303797 A1*   12/2008 Grothe .................... G06F 3/016
                                                345/173
(Continued)

FOREIGN PATENT DOCUMENTS

JP     2001216269        8/2001
KR     101160872 B1      7/2012
(Continued)

*Primary Examiner* — Naomi J Small

(57) ABSTRACT

Provided are an electronic device and method for performing an operation based on proximity of an external object with respect to the electronic device. In an embodiment, an electronic device includes a plurality of sensors including first, second, and third sensor sets. A processor configured to determine a proximity state of an external object using the first sensor set, wherein the proximity state indicates whether the external object exists near the electronic device and includes a first proximity state and a second proximity state. In response to the external object being in the first proximity state, determine a detailed proximity state of the external object using the second sensor set, and in response to the external object being in the second proximity state, determine the detailed proximity state of the external object with respect to the electronic device using the third sensor set.

8 Claims, 29 Drawing Sheets

(51) Int. Cl.
    *G06F 3/03*     (2006.01)
    *G06F 3/0346*     (2013.01)
    *G06F 3/041*     (2006.01)
    *G06F 3/16*     (2006.01)

(52) U.S. Cl.
    CPC ............ *G06F 3/16* (2013.01); *G08C 2201/91* (2013.01); *G08C 2201/93* (2013.01)

(58) Field of Classification Search
    USPC .......................................................... 340/3.1
    See application file for complete search history.

(56) References Cited

U.S. PATENT DOCUMENTS

| | | | |
|---|---|---|---|
| 2013/0088427 A1* | 4/2013 | Liu | G06F 3/017 345/157 |
| 2013/0207937 A1* | 8/2013 | Lutian | G06F 3/042 345/175 |
| 2013/0328842 A1 | 12/2013 | Barnhoefer et al. | |
| 2014/0111423 A1 | 4/2014 | Park et al. | |
| 2014/0118256 A1* | 5/2014 | Sonoda | G06F 3/0346 345/158 |
| 2014/0123273 A1* | 5/2014 | Matus | G06F 21/32 726/17 |
| 2014/0132779 A1 | 5/2014 | Kim et al. | |
| 2014/0168494 A1* | 6/2014 | Hong | G06F 1/3287 348/333.01 |
| 2014/0197922 A1* | 7/2014 | Stanwood | G06F 21/32 340/5.83 |
| 2014/0267025 A1* | 9/2014 | Kim | G06F 3/017 345/156 |
| 2014/0282877 A1* | 9/2014 | Mahaffey | H04L 63/0853 726/3 |
| 2014/0361979 A1 | 12/2014 | Woo et al. | |

FOREIGN PATENT DOCUMENTS

| | | |
|---|---|---|
| KR | 20130141844 | 12/2013 |
| KR | 20140051572 | 5/2014 |
| KR | 20140061135 | 5/2014 |
| KR | 20140142862 | 12/2014 |
| KR | 20140147647 | 12/2014 |
| KR | 20150011046 | 1/2015 |
| KR | 20150013610 | 2/2015 |
| WO | 2004053665 A1 | 6/2004 |

\* cited by examiner

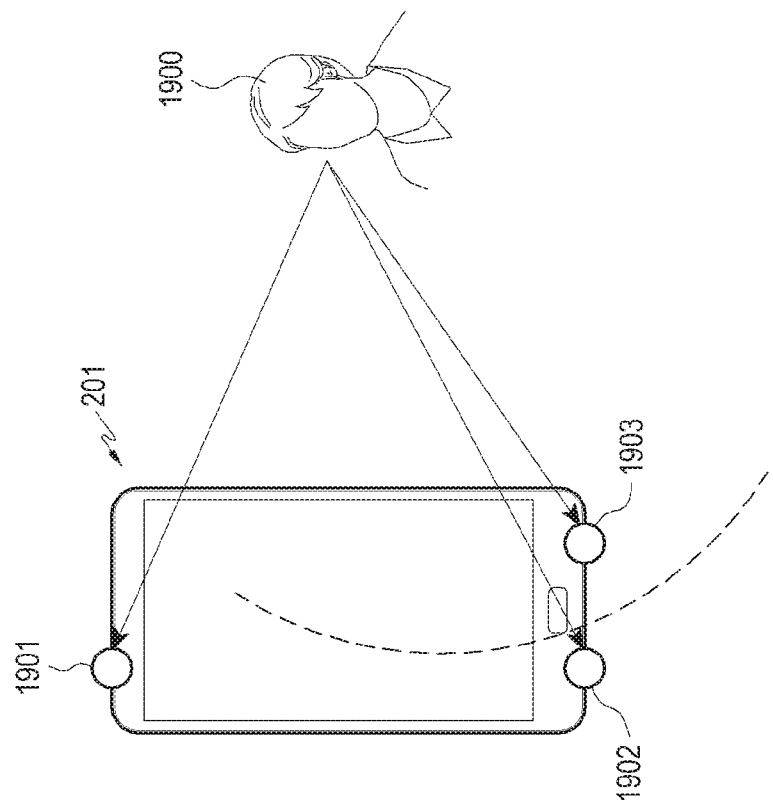
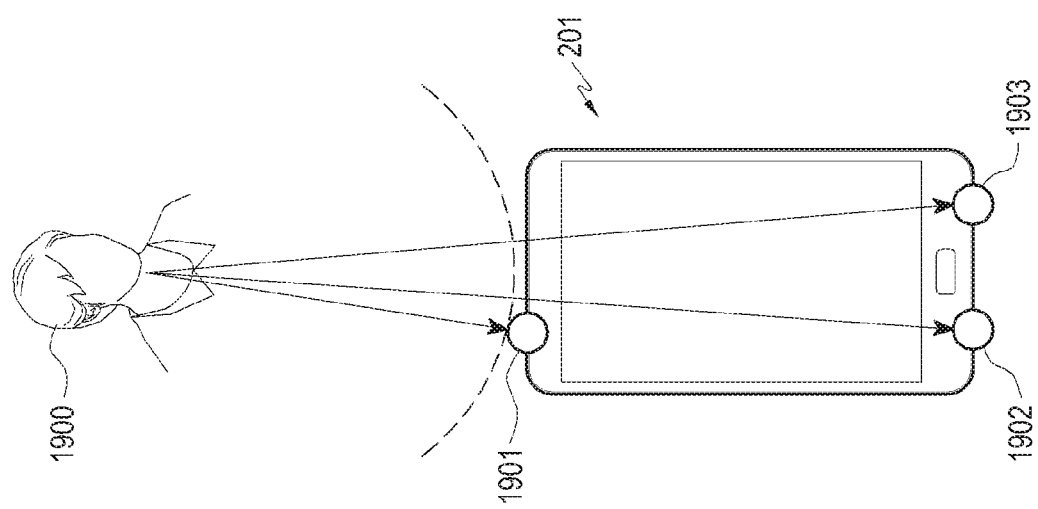
FIG.19B
FIG.19A

ELECTRONIC DEVICE AND METHOD FOR PERFORMING OPERATIONS ACCORDING TO PROXIMITY OF EXTERNAL OBJECT

CROSS-REFERENCE TO RELATED APPLICATION(S) AND CLAIM OF PRIORITY

The present application is related to and claims the benefit under 35 U.S.C. § 119(a) of a Korean patent application filed in the Korean Intellectual Property Office on Nov. 12, 2015 and assigned Serial No. 10-2015-0159236, the entire disclosure of which is incorporated herein by reference.

TECHNICAL FIELD

Various embodiments of the present disclosure relate to an electronic device, method and computer-readable recording medium for performing operations according to proximity of an external object.

BACKGROUND

Generally, an electronic device connects to an external device through short-range communication to sense proximity of a user having the external device and determines proximity of the user by using a distance to the connected external device to perform a corresponding operation.

Moreover, the electronic device may include a sensor capable of sensing proximity of an external object and perform a set operation according to a state sensed by the sensor. For example, the electronic device may include a proximity sensor capable of sensing proximity of a body of a user and perform a corresponding function if a signal is output from the proximity sensor.

As such, conventionally, the electronic device senses proximity of a user having the external device or performs an operation corresponding to a state sensed by the proximity sensor included in the electronic device.

Recently, much attention has been paid on a method for recognizing a proximity intention based on proximity of an external object and performing an operation of an electronic device according to the recognized proximity intention.

Hence, a need exists for a method for recognizing an intention of proximity of an external object and operating according to the recognized proximity intention by an electronic device.

The above information is presented as background information only to assist with an understanding of the present disclosure. No determination has been made, and no assertion is made, as to whether any of the above might be applicable as prior art with regard to the present disclosure.

SUMMARY

To address the above-discussed deficiencies, it is a primary object to provide an electronic device and method for performing operations according to proximity of an external object.

According to an embodiment of the present disclosure, an electronic device includes a plurality of sensors and a processor, in which the processor determines a proximity state of an external object with respect to the electronic device, which indicates whether the external object exists around the electronic device, by using a first sensor set from among the plurality of sensors, determines a detailed proximity state of the external object with respect to the electronic device, which indicates whether the external object exists in a proximity region of the electronic device, by using a second sensor set from among the plurality of sensors if the external object is in a first proximity state with respect to the electronic device, and determines a detailed proximity state of the external object with respect to the electronic device by using a third sensor set from among the plurality of sensors if the external object is in a second proximity state with respect to the electronic device.

According to another embodiment of the present disclosure, an electronic device includes a plurality of sensors and a processor, in which the processor determines a proximity state of an external object with respect to the electronic device, which indicates whether the external object exists around the electronic device, by using at least one of the plurality of sensors in a first mode, determines a detailed proximity state of the external object with respect to the electronic device, which indicates whether the external object exists in a proximity region of the electronic device, by using the at least one sensor in a second mode if the external object is in a first proximity state with respect to the electronic device, and determines a detailed proximity state of the external object with respect to the electronic device by using the at least one sensor in a third mode if the external object is in a second proximity state with respect to the electronic device.

According to another embodiment of the present disclosure, a method for operating an electronic device includes sensing first proximity of an external object with respect to the electronic device by using a first sensor included in the electronic device, determining a second sensor by using context information of the electronic device, sensing second proximity of the external object with respect to the electronic device by using the determined second sensor, and performing a function of the electronic device based on the sensed second proximity.

Other aspects, advantages, and salient features of the disclosure will become apparent to those skilled in the art from the following detailed description, which, taken in conjunction with the annexed drawings, discloses exemplary embodiments of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 19A and 19B illustrate examples for describing a method for determining second proximity of an external object by using a plurality of microphones according to various embodiments of the present disclosure;

Throughout the drawings, like reference numerals will be understood to refer to like parts, components, and structures.

DETAILED DESCRIPTION

Figure 1:
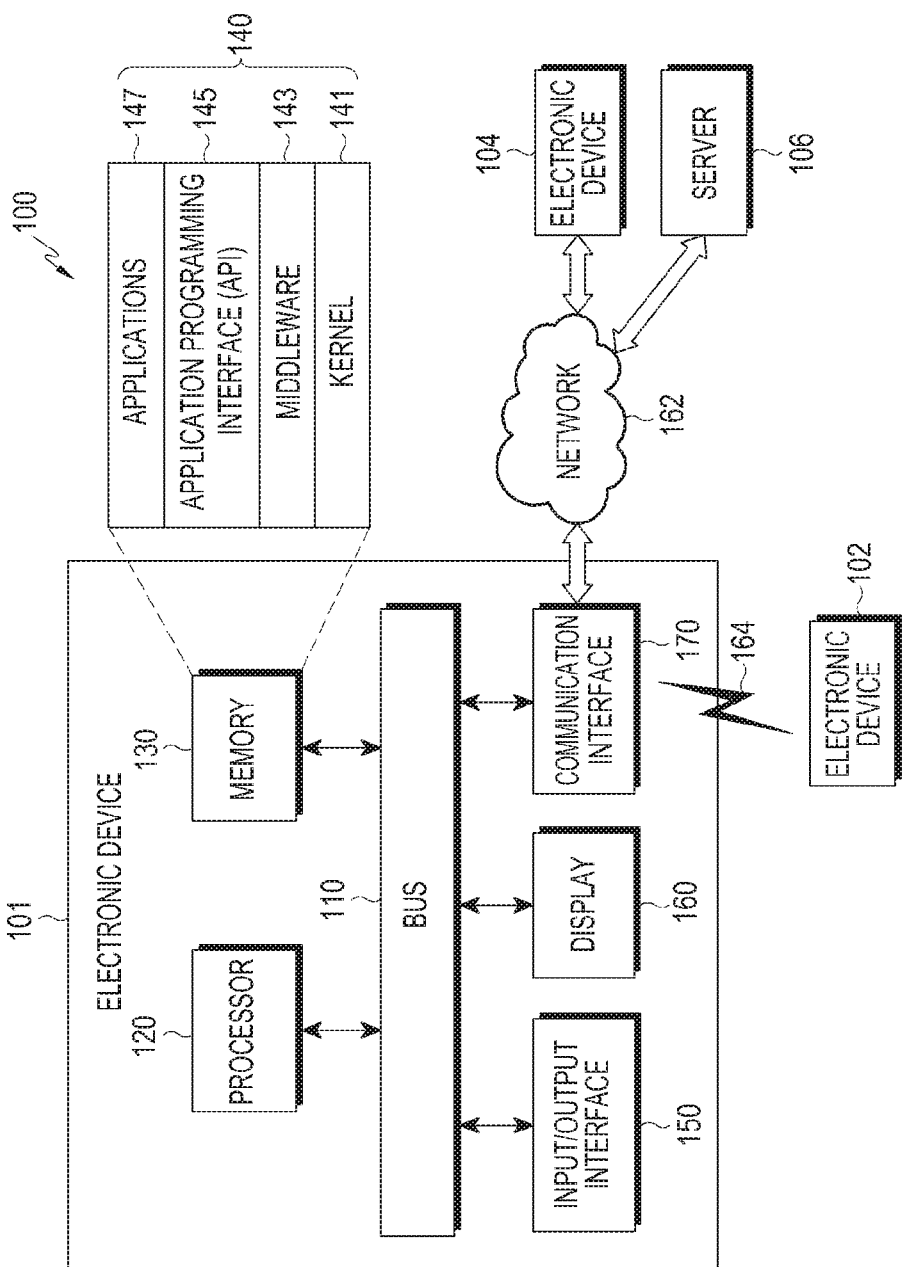
FIG. 1 illustrates a network environment including an electronic device according to various embodiments of the present disclosure.

FIGS. 1 through 31, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic devices.

Hereinafter, various embodiments of the present disclosure will be disclosed with reference to the accompanying drawings. However, the description is not intended to limit the present disclosure to particular embodiments, and it should be construed as including various modifications, equivalents, and/or alternatives according to the embodiments of the present disclosure. In regard to the description of the drawings, like reference numerals refer to like elements.

In the present disclosure, an expression such as "having," "may have," "comprising," or "may comprise" indicates existence of a corresponding characteristic (e.g., a numerical value, a function, an operation, or an element like a part) and does not exclude existence of additional characteristic.

In the present disclosure, an expression such as "A or B," "at least one of A or/and B," or "one or more of A or/and B" may include all possible combinations of together listed items. For example, "A or B," "at least one of A and B," or "one or more of A or B" may indicate the entire of (1) including at least one A, (2) including at least one B, or (3) including both at least one A and at least one B.

Expressions such as "first," "second," "primarily," or "secondary," used herein may represent various elements regardless of order and/or importance and do not limit corresponding elements. For example, a first user device and a second user device may represent different user devices regardless of order or importance. For example, a first element may be named as a second element without departing from the right scope of the various exemplary embodiments of the present disclosure, and similarly, a second element may be named as a first element.

When it is described that an element (such as a first element) is "operatively or communicatively coupled with/to" or "connected" to another element (such as a second element), the element can be directly connected to the other element or can be connected to the other element through another element (e.g., a third element). However, when it is described that an element (such as a first element) is "directly connected" or "directly coupled" to another element (such as a second element), it means that there is no intermediate element (such as a third element) between the element and the other element.

An expression "configured to (or set)" used in the present disclosure may be replaced with, for example, "suitable for," "having the capacity to," "designed to," "adapted to," "made to," or "capable of" according to a situation. A term "configured to (or set)" does not always mean only "specifically designed to" by hardware. Alternatively, in some situation, an expression "apparatus configured to" may mean that the apparatus "can" operate together with another apparatus or component. For example, a phrase "a processor configured (or set) to perform A, B, and C" may be a dedicated processor (e.g., an embedded processor) for performing a corresponding operation or a generic-purpose processor (such as a CPU or an application processor) that can perform a corresponding operation by executing at least one software program stored at a memory device.

Terms defined in the present disclosure are used for only describing a specific exemplary embodiment and may not have an intention to limit the scope of other exemplary embodiments. The singular forms are intended to include the plural forms as well, unless the context clearly indicates otherwise. All of the terms used herein including technical or scientific terms have the same meanings as those generally understood by an ordinary skilled person in the related art. The terms defined in a generally used dictionary should be interpreted as having meanings that are the same as or similar with the contextual meanings of the relevant technology and should not be interpreted as having ideal or exaggerated meanings unless they are clearly defined in the various exemplary embodiments. In some case, terms defined in the present disclosure cannot be analyzed to exclude the present exemplary embodiments.

An electronic device according to various embodiments of the present disclosure may include at least one of, for example, a smartphone, a tablet personal computer (PC), a mobile phone, a video phone, an electronic-book (e-book) reader, a destkop PC, a laptop PC, a netbook computer, a workstation, a server, a personal digital assistant (PDA), a portable multimedia player (PMP), an MP3 player, a mobile medical equipment, a camera, and a wearable device. According to various embodiments, examples of the wearable device may include at least one of an accessory type (e.g., a watch, a ring, a bracelet, an anklet, a necklace, glasses, contact lenses, head-mounted device (HMD), etc.), a fabric or cloth-integrated type (e.g., electronic clothing, etc.), a body-attached type (e.g., a skin pad, a tattoo, etc.), a body implanted type (e.g., an implantable circuit, etc.), and so forth.

In some embodiments, an electronic device may be a home appliance. The electronic device may include, for example, a television (TV), a digital video disk (DVD) player, audio equipment, a refrigerator, an air conditioner, a vacuum cleaner, an oven, a microwave oven, a laundry machine, an air cleaner, a set-top box, a home automation control panel, a security control panel, a TV box (e.g., HomeSync™ of Samsung, TV™ of Apple, or TV™ of Google), a game console, an electronic dictionary, an electronic key, a camcorder, and an electronic frame.

The electronic device may include at least one of various medical equipment (for example, magnetic resonance angiography (MRA), magnetic resonance imaging (MM), computed tomography (CT), an imaging device, or an ultrasonic device), a navigation system, a global positioning system (GPS) receiver, an event data recorder (EDR), a flight data recorder (FDR), a vehicle infotainment device, electronic equipment for ships (e.g., a navigation system and gyro compass for ships), avionics, a security device, a vehicle head unit, an industrial or home robot, an automatic teller's machine (ATM), a point of sales (POS), Internet of things (e.g., electric bulbs, various sensors, electricity or gas meters, sprinkler devices, fire alarm devices, thermostats, streetlights, toasters, exercise machines, hot-water tanks, heaters, boilers, and so forth).

According to some embodiments, the electronic device may include a part of a furniture or building/structure, an electronic board, an electronic signature receiving device, a projector, and various measuring instruments (e.g., a water, electricity, gas, electric wave measuring device, etc.). The electronic device according to various embodiments of the present disclosure may be one of the above-listed devices or a combination thereof. The electronic device according to some embodiments may be a flexible electronic device. The electronic device according to various embodiments of the present disclosure is not limited to the above-listed devices and may include new electronic devices according to technical development.

Hereinafter, an electronic device according to various embodiments of the present disclosure will be described with reference to the accompanying drawings. Herein, the term "user" used in various embodiments of the present disclosure may refer to a person who uses the electronic device or a device using the electronic device.

Referring to FIG. 1, an electronic device 101 in a network environment 100 according to various embodiments of the present disclosure is disclosed. The electronic device 101 may include a bus 110, a processor 120, a memory 130, an input/output (I/O) interface 150, a display 160, and a communication interface 170. According to some embodiments, the electronic device 101 may omit at least one of the foregoing elements or may further include other elements.

The bus 110 may include a circuit for connecting, e.g., the elements 110 to 170 and delivering communication (e.g., a control message and/or data) between the elements 110 to 170.

The processor 120 may include one or more of a central processing unit (CPU), an application processor (AP), and a communication processor (CP). The processor 120 performs operations or data processing for control and/or communication of, for example, at least one other elements of the electronic device 101.

The memory 130 may include a volatile and/or nonvolatile memory. The memory 130 may store, for example, commands or data associated with at least one other elements of the electronic device 101. According to an embodiment of the present disclosure, the memory 130 may store software and/or a program 140. The program 140 may include at least one of, for example, a kernel 141, middleware 143, an application programming interface (API) 145, and/or an application program (or "application") 147, and the like. At least some of the kernel 141, the middleware 143, and the API 145 may be referred to as an operating system (OS).

The kernel 141 may control or manage, for example, system resources (e.g., the bus 110, the processor 120, the memory 130, etc.) used to execute operations or functions implemented in other programs (e.g., the middleware 143, the API 145, or the application program 147). The kernel 141 provides an interface through which the middleware 143, the API 145, or the application program 147 accesses separate components of the electronic device 101 to control or manage the system resources.

The middleware 143 may work as an intermediary for allowing, for example, the API 145 or the application program 147 to exchange data in communication with the kernel 141.

In addition, the middleware 143 may process one or more task requests received from the application program 147 based on priorities. For example, the middleware 143 may give a priority for using a system resource (e.g., the bus 110, the processor 120, the memory 130, etc.) of the electronic device 101 to at least one of the application programs 147. For example, the middleware 143 may perform scheduling or load balancing with respect to the one or more task requests by processing the one or more task requests based on the priority given to the at least one of the application programs 147.

The API 145 is an interface used for the application 147 to control a function provided by the kernel 141 or the middleware 143, and may include, for example, at least one interface or function (e.g., a command) for file control, window control, image processing or character control.

The I/O interface 150 serves as an interface for delivering, for example, a command or data input from a user or another external device to other component(s) of the electronic device 101. The I/O interface 150 may also output a command or data received from other component(s) of the electronic device 101 to a user or another external device.

The display 160 may include, for example, a liquid crystal display (LCD), a light emitting diode (LED) display, an organic light emitting diode (OLED) display, a microelectromechanical system (MEMS) display, or an electronic paper display. The display 160 may, for example, display various contents (e.g., a text, an image, video, an icon, a symbol, etc.) to users. The display 160 may include a touch screen, and receives a touch, a gesture, proximity, or a hovering input, for example, by using an electronic pen or a part of a body of a user.

The communication interface 170 establishes communication between the electronic device 101 and an external device (e.g., a first external electronic device 102, a second external electronic device 104, or a server 106). For example, the communication interface 170 may be connected to a network 162 through wireless communication or wired communication to communicate with an external device (e.g., the second external electronic device 104 or the server 106).

Wired communication may use, for example, as a cellular communication protocol, at least one of, for example, long-term evolution (LTE), LTE advance (LTE-A), code division multiple access (CDMA), wideband CDMA (WCDMA), universal mobile telecommunications system (UMTS), wireless broadband (WiBro), global system for mobile communications (GSM), and so forth. The wireless communication may include, for example, short-range communication 164. The short-range communication 164 may include, for example, at least one of wireless fidelity (WiFi), Bluetooth®, near field communication (NFC), a global navigation satellite system (GNSS), and the like. Depending on a usage area or bandwidth, the GNSS may include, for example, at least one of a global positioning system (GPS), a global navigation satellite system (Glonass®), a Beidou navigation satellite system (Beidou®), and Galileo®, the European global satellite-based navigation system. Hereafter, "GPS" may be used interchangeably with "GNSS". The wired communication may include, for example, at least one of a USB (universal serial bus), a high definition multimedia interface (HDMI), a recommended standard (RS)-232, a plain old telephone service (POTS), and so forth. The network 162 may include a telecommunications network, for example, at least one of a computer network (e.g., a local area network (LAN) or a wide area network (WAN)), Internet, and a telephone network.

Each of the first external electronic device 102 and the second external electronic device 104 may be a device of the same type as or a different type than the electronic device 101. According to an embodiment of the present disclosure, the server 106 may include a group of one or more servers. According to various embodiments of the present disclosure, some or all of operations performed by the electronic device 101 may be performed in another electronic device or a plurality of electronic devices (e.g., the electronic device 102 or 104, or the server 106). According to an embodiment of the present disclosure, when the electronic device 101 has to perform a function or a service automatically or at a request, the electronic device 101 may request another device (e.g., the electronic devices 102 or 104, or the server 106) to perform at least some functions associated with the function or the service instead of or in addition to executing the function or the service. The another electronic device (e.g., the electronic device 102 or 104, or the server 106) may execute the requested function or additional function and deliver the execution result to the electronic device 101. The electronic device 101 may then process or further process the received result to provide the requested function or service. To this end, for example, cloud computing, distributed computing, or client-server computing may be used.

Figure 2:
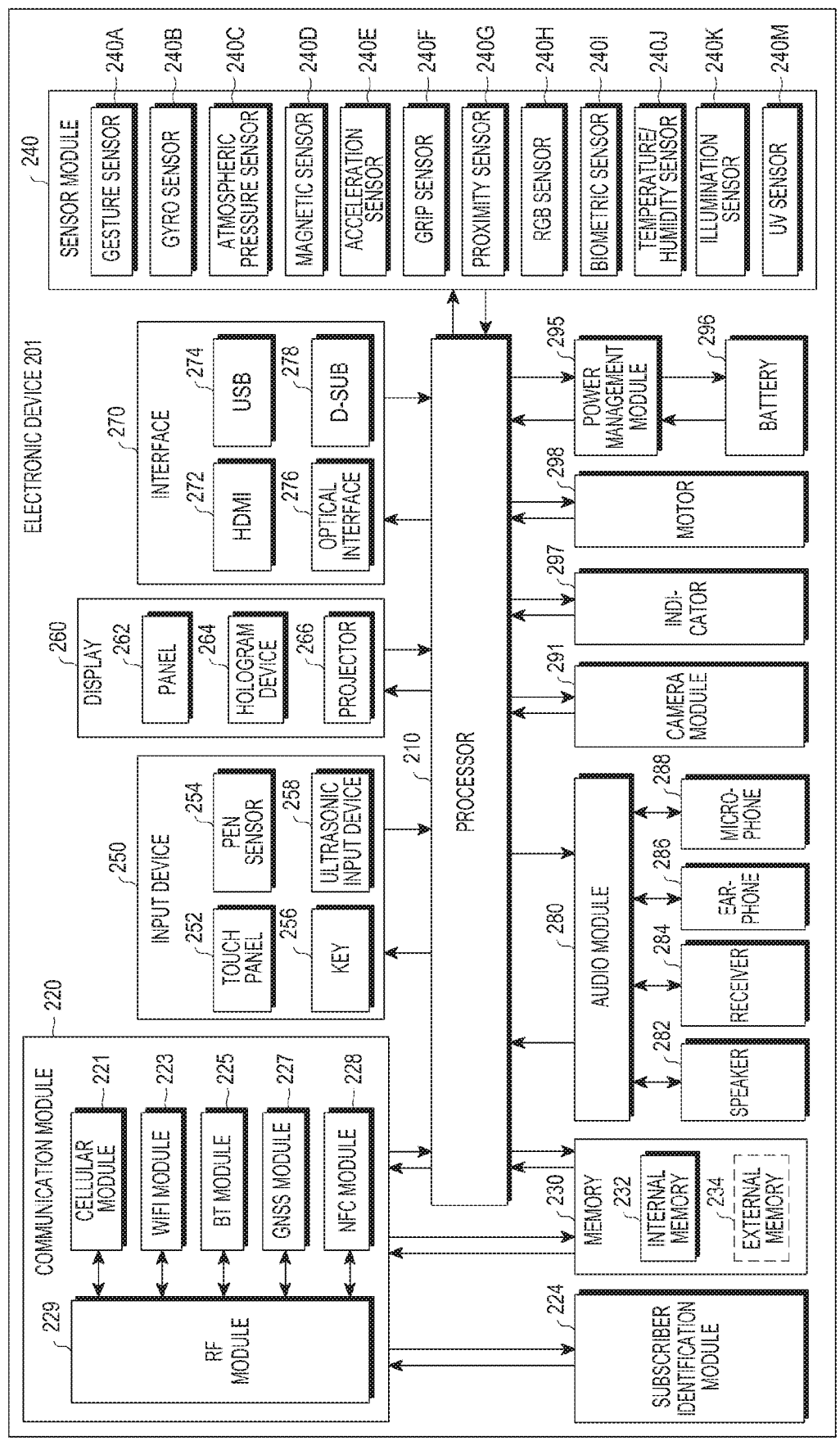
FIG. 2 is a block diagram illustrating an electronic device according to various embodiments of the present disclosure.

FIG. 2 is a block diagram of an electronic device 201 according to various embodiments of the present disclosure.

The electronic device 201 may form the entire electronic device 101 illustrated in FIG. 1 or a part of the electronic device 101 illustrated in FIG. 1. The electronic device 201 may include one or more processors (e.g., application processors (APs)) 210, a communication module 220, a subscriber identification module (SIM) 224, a memory 230, a sensor module 240, an input device 250, a display 260, an interface 270, an audio module 280, a camera module 291, a power management module 295, a battery 296, an indicator 297, and a motor 298.

The processor 210 controls multiple hardware or software components connected to the processor 210 by driving an operating system (OS) or an application program, and performs processing and operations with respect to various data. The processor 210 may be implemented with, for example, a system on chip (SoC). According to an embodiment, the processor 210 may further include a graphic processing unit (GPU) and/or an image signal processor. The processor 210 may include at least some of the elements illustrated in FIG. 2 (e.g., the cellular module 221). The processor 210 loads a command or data received from at least one of other elements (e.g., a non-volatile memory) into a volatile memory to process the command or data, and stores various data in the non-volatile memory.

According to an embodiment of the present disclosure, the processor 210 determines a proximity state of an external object with respect to the electronic device 201 by using a first sensor set from among a plurality of sensors, determines a detailed proximity state of the external object with respect to the electronic device 201 by using a second sensor set from among the plurality of sensors if the external object is in a first proximity state with respect to the electronic device 201, and determines a detailed proximity state of the external object with respect to the electronic device 201 by using a third sensor set from among the plurality of sensors if the external object is in a second proximity state with respect to the electronic device 201.

The respective sensor sets may include a single sensor or a plurality of sensors. The plurality of sensors may include an identical type of sensors or two or more different sensors. For example, the plurality of sensors may include a plurality of microphones, and may include a proximity sensor 240G and an acceleration sensor 240E.

The external object may be a person or a device, and the person may be a known person or an unknown person, and the device may be an authorizable device (or a registered device) or a new device. The external object may be one or two or more objects.

The proximity state refers to a state where a person or an external device exists around the electronic device 201, and the detailed proximity state refers to a state where the person or device is located in a maximum proximity region to use the electronic device 201. The maximum proximity region may include a distance in which a person may use the electronic device 201 or a distance in which the external device may be connected with the electronic device 201.

The first proximity state or the second proximity state may include a state where the external object is recognized within a specific region. For example, the processor 210 may determine the first proximity state or the second proximity state if an impulse signal input through the microphone 288 is a waveform over a specific sound pressure, a pattern that is the same as a preset threshold pattern, or an impulse signal over a specific number of times.

According to an embodiment of the present disclosure, the processor 210 determines a proximity state of an external object with respect to the electronic device 201 by using at least one of a plurality of sensors in a first mode, determines a detailed proximity state of the external object with respect to the electronic device 201 by using at least one sensor in a second mode if the external object is in a first proximity state with respect to the electronic device 201, and determines a detailed proximity state of the external object with respect to the electronic device 201 by using at least one sensor in a third mode if the external object is in a second proximity state with respect to the electronic device 201.

For example, the first mode may include a method for determining a proximity state of the external object by using one microphone, and the second mode may include a method for determining a detailed proximity state of the external object by using a plurality of microphones. For example, the first mode may include a method for measuring an acceleration by using some of x, y, and z axes of an acceleration sensor, and the second mode may include a method for measuring an acceleration by using other some axes of the acceleration sensor.

According to an embodiment of the present disclosure, the processor 210 senses first proximity of the external object by using a first sensor set among a plurality of sensors, determines context information of the electronic device 201 to determine a second sensor set among the plurality of sensors, senses second proximity of the external object by using the determined second sensor set, determines a proximity intention of the external object by using a third sensor set among the plurality of sensors, and performs a function of the electronic device 201 corresponding to the determined proximity intention.

When sensing the first proximity using the first sensor set, the processor 210 determines a type or a number of external objects as well as a distance to the external object. For example, if the first sensor set includes the camera module 291, the processor 210 may perform face recognition from a scene that is input through the camera module 291 to determine whether the external object is a person or one or more faces are recognized. For example, if the first sensor set includes the RF module 229, the processor 210 may sense a beacon signal that is input through the RF module 229 to determine whether the external object is an external device or one or more external devices exist.

The first sensor set may include the microphone 288, an antenna (not shown), the acceleration sensor 240E, the camera module 291, and the RF module 229. The second sensor set may include the display (e.g., a sensor-in-pixel) 260, the camera module 291, and the microphone 288. The third sensor set may include the camera module 291, the display 260, the input device 250, the gyro sensor 240B, the acceleration sensor 240E, and the grip sensor 240F.

If the first sensor set includes the microphone 288, the processor 210 receives a first audio signal from the microphone 288, analyzes the received first audio signal, and determines whether the received first audio signal is a first proximity signal. To determine whether the received first audio signal is the first proximity signal, the processor 210 compares the first audio signal with a previously stored threshold signal to determine whether the first audio signal matches the previously stored threshold signal. If a difference between the first audio signal and the previously stored threshold signal is less than a preset threshold difference, the processor 210 determines that the first audio signal and the threshold signal match each other.

If the first audio signal is determined as the first proximity signal, the processor 210 determines first proximity of the external object. The first proximity may indicate that the external object is recognized in the first proximity region of the electronic device 201.

If the first proximity of the external object is determined, the processor 210 determines context information such as location information, orientation state information, time information, schedule information, or contact information to determine the second sensor set.

If the electronic device 201 is located in a house, a company, a school, or the like, the processor 210 determines at least one available sensor corresponding to each of the house, the company, the school, and so forth as the second sensor set. For example, if the corresponding available sensors are the camera module 291 and the display 260 when the location of the electronic device 201 is the company, the processor 210 may determine the camera module 291 or the display 260 as the second sensor set.

The processor 210 determines at least one of the display 260, the camera module 291, and the microphone 288 as the second sensor set if an orientation value of the electronic device 201 is included in a threshold orientation range. For example, according to whether the orientation value of the electronic device 201 is in a range of 0° to 10°, in a range of 170° to 180°, or in a range of 11° to 169°, at least one sensor may be determined as the second sensor set. If the orientation value of the electronic device 201 is in a range of 0° to 10° or in a range of 170° to 180°, the processor 210 determines that the electronic device 201 is placed in a particular location. If determining so, the processor 210 determines the camera module 291 and the microphone 288 as the second sensor set. If the orientation value of the electronic device 201 is in a range of 11° to 169°, the processor 210 determines that the user holds the electronic device 201 by hand. If determining so, the processor 210 determines the display 260 and the camera module 291 as the second sensor set. According to various embodiments, the orientation value of the electronic device 201 is not limited to the above description and may be set variously.

The processor 210 determines at least one of the display 160, the camera module 291, and a plurality of microphones being set according to a previously designated time or a preset schedule as the second sensor set. For example, if an alarm is set for 3:00 pm, the processor 210 determines the microphone 288 and the acceleration sensor 240E as the second sensor set to sense proximity of an external object at the time set for the alarm.

Once sensing contact of the external object through the touch panel 252 of the input device 250, the processor 210 determines that the external object is located in a maximum proximity distance of the electronic device 201 and determines the display 260 and the camera module 291 as the second sensor set.

The above-described sensors are not limited to the foregoing disclosure, and various sensors may be used for proximity of the external object.

If the determined second sensor set includes a camera, the processor 210 determines second proximity of the external object if the external object is recognized in a specific region of a scene input through the camera. The second proximity may indicate that the external object is recognized in the second proximity region of the electronic device 201. Once the external object is recognized in the second proximity region, the processor 210 recognizes that the external object is in proximity to the electronic device 201 to use the electronic device 201.

Once the second proximity of the external object is determined, the processor 210 determines a third sensor set from among a plurality of sensors based on the second proximity and determines proximity intention of the external object by using the determined third sensor set. The processor 210 determines at least one of the camera module 291, the display 260, the input device 250, the gyro sensor 240B, the acceleration sensor 240E, and the grip sensor 240F, which is used to determine proximity intention of the external object, as the third sensor set.

For example, if the determined third sensor set includes the camera module 291, the processor 210 performs iris recognition by using the camera module 291 and determines proximity intention of the external object as proximity for user authentication if the iris is recognized. The processor 210 performs user authentication based on iris recognition, and performs a function of the electronic device 201 that is set corresponding to user authentication if the external object is identified as the user of the electronic device 201. If the set function of the electronic device 201 is a function of unlocking the lock screen of the electronic device 201, the processor 210 unlocks the lock screen of the electronic device 201 once identifying the external object as the user of the electronic device 201.

According to an embodiment, the processor 210 senses first proximity of the external object by using a first sensing method, determines context information of the electronic device 201 to determine a second sensing method, senses second proximity of the external object by using the determined second sensing method, determines a proximity intention of the external object by using a third sensing method, and performs a function of the electronic device 201 corresponding to the determined proximity intention.

For example, if the first sensing method is a method for sensing proximity of the external object by using one microphone, the processor 210 analyzes a first audio signal input through one microphone to determine whether the external object is recognized in the first proximity region.

If the first proximity of the external object is sensed, the processor 210 determines context information such as location information, orientation state information, time information, schedule information, or contact information to determine the second sensing method based on the determined context information. For example, if the orientation value of the electronic device 201 is greater than or equal to a threshold orientation value or if a surrounding noise of the electronic device 201 is less than a threshold value, the processor 210 may determine a method for sensing proximity of the external object by using a plurality of microphones as the second sensing method. If the orientation value of the electronic device 201 is greater than or equal to a threshold orientation value or if a surrounding brightness of the electronic device 201 is greater than or equal to a threshold value, the processor 210 may determine a method for sensing proximity of the external object by using the display 260 as the second sensing method.

If the second sensing method is a method for sensing proximity of the external object by using a plurality of microphones, the processor 210 analyzes a plurality of audio signals input through a plurality of microphones to determine whether the external object is recognized in the second proximity region. The processor 210 analyzes a plurality of audio signals to determine a proximity direction and a proximity distance of the external object, calculates a location corresponding to the determined proximity direction and proximity distance, and determines whether the calculated location is included in the second proximity region. If the calculated location is included in the second proximity region, the processor 210 determines second proximity of the external object.

If the second sensing method is a method for sensing proximity of the external object by using the display 260, the processor 210 analyzes a light-receiving signal input through the display 260 and determines that the external object is included in the second proximity distance if the sensed amount of light is less than a threshold value or the number of sensed sensors (e.g., the number of pixels in the display 260) is greater than or equal to a threshold value.

The processor 210 determines a third sensing method based on the second proximity of the external object and determines proximity intention of the external object by using the determined third sensing method.

For example, if the third sensing method is a motion sensing method using the camera module 291, the processor 210 senses motion of the external object by using the camera module 291 to determine whether the external object is approaching the electronic device 201. If the external object is approaching the electronic device 201, the processor 210 changes a screen direction of the electronic device 201 based on an approaching direction of the external object and displays the screen.

If the third sensing method is a method for sensing a holding form by using the touch panel 252, the processor 210 senses a form in which the external object holds the electronic device 201 by using the touch panel 252 and determines proximity intention of the external object based on the sensed holding form. If the sensed holding form is determined as a preset holding form corresponding to a call function of the electronic device 201, the processor 210 determines the proximity intention of the external object as the intention of using the call function of the electronic device 201. The processor 210 displays a user interface corresponding to the call function on the display 260.

The communication module 220 may have a configuration that is the same as or similar to the communication interface 170 illustrated in FIG. 1. The communication module 220 may include, for example, at least one of the cellular module 221, a WiFi module 223, a Bluetooth (BT) module 225, a GNSS module 227 (e.g., a GPS module, a Glonass module, a Beidou® module, or a Galileo® module), a near field communication (NFC) module 228, and a radio frequency (RF) module 229. According to an embodiment, the communication module 220 may include an antenna (not shown).

The cellular module 221 may provide, for example, a voice call, a video call, a text service, or an Internet service over a communication network. According to an embodiment, the cellular module 221 identifies and authenticates the electronic device 201 in a communication network by using the SIM 224 (e.g., a SIM card). According to an embodiment, the cellular module 221 performs at least one of functions that may be provided by the processor 210. According to an embodiment, the cellular module 221 may include a communication processor (CP).

Each of the WiFi module 223, the BT module 225, the GNSS module 227, and the NFC module 228 may include, for example, a processor for processing data transmitted and received by a corresponding module. According to some embodiment, at least some (e.g., two or more) of the cellular module 221, the WiFi module 223, the BT module 225, the GNSS module 227, and the NFC module 228 may be included in one integrated chip (IC) or IC package.

The RF module 229 may, for example, transmit and receive a communication signal (e.g., an RF signal). The RF module 229 may include a transceiver, a power amplification module (PAM), a frequency filter, a low noise amplifier (LNA), or an antenna. According to another embodiment, at least one of the cellular module 221, the WiFi module 223, the BT module 225, the GNSS module 227, and the NFC module 228 may transmit and receive an RF signal through the separate RF module.

The SIM 224 may, for example, include a card including an SIM and/or an embedded SIM, and may include unique identification information (e.g., an integrated circuit card identifier (ICCID) or subscriber information (e.g., an international mobile subscriber identity (IMSI)).

The memory 230 (e.g., the memory 130) may, for example, include an internal memory 232 and/or an external memory 234. The internal memory 232 may, for example, include at least one of a volatile memory (e.g., dynamic random access memory (DRAM), static RAM (SRAM), synchronous dynamic RAM (SDRAM), etc.), and a non-volatile memory (e.g., one time programmable read only memory (OTPROM), programmable ROM (PROM), erasable and programmable ROM (EPROM), electrically erasable and programmable ROM (EEPROM), etc.), mask ROM, flash ROM, NAND flash memory, NOR flash memory, etc.), and a solid state drive (SSD).

The external memory 234 may further include flash drive, for example, compact flash (CF), secure digital (SD), micro-SD, mini-SD, extreme Digital (xD), a multi-media card (MMC), or a memory stick. The external memory 234 may be functionally and/or physically connected with the electronic device 201 through various interfaces.

According to an embodiment of the present disclosure, the memory 230 may store any information used for performing a function of the electronic device 201 based on proximity of an external object determined by the processor 210.

The sensor module 240 measures physical quantity or senses an operation state of the electronic device 201 to convert the measured or sensed information into an electric signal. The sensor module 240 may, for example, include at least one of a gesture sensor 240A, a gyro sensor 240B, a pressure sensor 240C, a magnetic sensor 240D, an acceleration sensor 240E, a grip sensor 240F, a proximity sensor 240G, a color sensor 240H (e.g., RGB sensor), a biometric sensor 240I, a temperature/humidity sensor 240J, an illumination sensor 240K, and a ultraviolet (UV) sensor 240M. Additionally or alternatively, the sensor module 240 may include an E-nose sensor (not shown), an electromyography (EMG) sensor (not shown), an electroencephalogram (EEG) sensor (not shown), an electrocardiogram (ECG) sensor (not shown), an infrared (IR) sensor, an iris sensor, and/or a fingerprint sensor. The sensor module 240 may further include a control circuit for controlling at least one sensor included therein. In some embodiment, the electronic device 201 may further include a processor configured to control the sensor module 240 as part of or separately from the processor 210, to control the sensor module 240 during a sleep state of the processor 210.

The input device 250 may include, for example, a touch panel 252, a (digital) pen sensor 254, a key 256, or an ultrasonic input device 258. The touch panel 252 may use at least one of a capacitive type, a resistive type, an IR type, or an ultrasonic type. The touch panel 252 may further include a control circuit. The touch panel 252 may further include a tactile layer to provide tactile reaction to the user.

The (digital) pen sensor 254 may include a recognition sheet which is a part of the touch panel 252 or a separate recognition sheet. The key 256 may also include a physical button, an optical key, or a keypad. The ultrasonic input device 258 senses ultrasonic waves generated by an input means through a microphone (e.g., the microphone 288) and checks data corresponding to the sensed ultrasonic waves.

The display 260 (e.g., the display 160) may include a panel 262, a hologram device 264, or a projector 266. The panel 262 may have a configuration that is the same as or similar to the display 160 illustrated in FIG. 1. The panel 262 may be implemented to be flexible, transparent, or wearable. The panel 262 may be configured with the touch panel 252 in one module. The hologram device 264 shows a stereoscopic image in the air by using interference of light. The projector 266 displays an image onto an external screen through projection of light. The screen may be positioned inside or outside the electronic device 201. According to an embodiment, the display 260 may further include a control circuit for controlling the panel 262, the hologram device 264, or the projector 266. According to an embodiment, the display 260 may include a sensor pixel and receive a light-receiving signal.

According to an embodiment, the interface 270 may include a high-definition multimedia interface (HDMI) 272, a universal serial bus (USB) 274, an optical communication 276, or a D-subminiature 278. The interface 270 may be included in the communication interface 170 illustrated in FIG. 1. Additionally or alternatively, the interface 270 may include a mobile high-definition link (MHL) interface, an SD/multi-media card (MMC) interface, or an Infrared Data Association (IrDA) interface.

The audio module 280 bi-directionally converts sound and an electric signal. At least one element of the audio module 280 may be included in the input/output interface 145 illustrated in FIG. 1. The audio module 280 processes sound information input or output through the speaker 282, the receiver 284, the earphone 286, or the microphone 288.

The camera module 291 is, for example, a device capable of capturing a still image or a moving image, and according to an embodiment, may include one or more image sensors (e.g., a front sensor or a rear sensor), a lens, an image signal processor (ISP), or a flash (e.g., an LED, a xenon lamp, etc.). According to an embodiment, the camera module 291 may include a plurality of cameras which may include an infrared camera, a motion recognition low-power camera, and so forth.

The power management module 295 manages power of the electronic device 201. According to an embodiment, the power management module 295 may include a power management integrated circuit (PMIC), a charger IC, or a battery fuel gauge. The PMIC may have a wired and/or wireless charging scheme. The wireless charging scheme includes a magnetic-resonance type, a magnetic induction type, and an electromagnetic type, and for wireless charging, an additional circuit, for example, a coil loop, a resonance circuit, or a rectifier may be further included. The battery gauge measures the remaining capacity of the battery 296 or the voltage, current, or temperature of the battery 296 during charging. The battery 296 may include a rechargeable battery and/or a solar battery.

The indicator 297 displays a particular state, for example, a booting state, a message state, or a charging state, of the electronic device 201 or a part thereof (e.g., the processor 210). The motor 298 converts an electric signal into mechanical vibration or generates vibration or a haptic effect. Although not shown, the electronic device 201 may include a processing device (e.g., a GPU) for supporting a mobile TV. The processing device for supporting the mobile TV processes media data according to, a standard such as digital multimedia broadcasting (DMB), digital video broadcasting (DVB), or MediaFlo®.

Each of the foregoing elements described herein may be configured with one or more components, names of which may vary with a type of the electronic device. In various embodiments, the electronic device may include at least one of the foregoing elements, some of which may be omitted or to which other elements may be added. In addition, some of the elements of the electronic device according to various embodiments may be integrated into one entity to perform functions of the corresponding elements in the same manner as before they are integrated.

Figure 3:
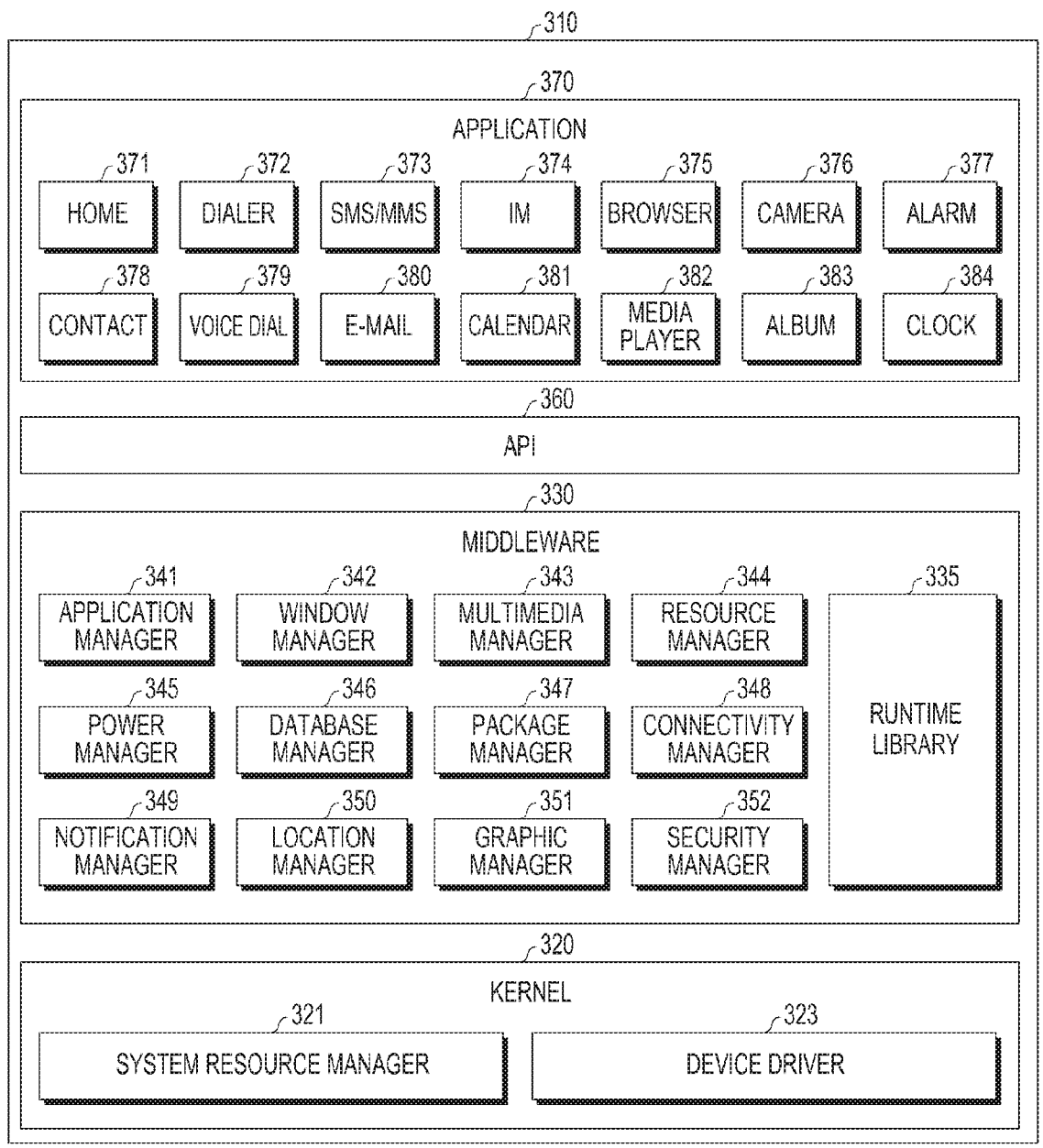
FIG. 3 is a block diagram illustrating a programming module according to various embodiments of the present disclosure.

FIG. 3 is a block diagram of a programming module according to various embodiments of the present disclosure. According to an embodiment, a programming module 310 (e.g., the program 140) may include an OS for controlling resources associated with an electronic device (e.g., the electronic device 101) and/or various applications (e.g., the application program 147) executed on the OS. The OS may include Android®, iOS®, Windows®, Symbian®, Tizen®, or Bada®.

The programming module 310 may include, for example, a kernel 320, middleware 330, an application programming interface (API) 360, and/or an application 370. At least a part of the programming module 310 may be preloaded on an electronic device or may be downloaded from an external device (e.g., the external device 102 or 104 or the server 106).

The kernel 320 (e.g., the kernel 141) may, for example, include a system resource manager 321 and/or a device driver 323. The system resource manager 321 may perform control, allocation, retrieval of system resources, and so forth. According to an embodiment, the system resource manager 321 may include a process management unit, a memory management unit, or a file system management unit. The device driver 323 may include, for example, a display driver, a camera driver, a Bluetooth® driver, a shared memory driver, a USB driver, a keypad driver, a WiFi driver, an audio driver, or an inter-process communication (IPC) driver.

The middleware 330 may include provide functions that the application 370 commonly requires or provide various functions to the application 370 through the API 360 to allow the application 370 to efficiently use a limited system resource in an electronic device. According to an embodiment, the middleware 330 (e.g., the middleware 143) may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include a library module that a compiler uses to add a new function through a programming language while the application 370 is executed. The runtime library 335 performs functions relating to an input/output, memory management, or calculation operation.

The application manager 341 manages a life cycle of at least one application among the applications 370. The window manager 342 manages a GUI resource using a screen. The multimedia manager 343 recognizes a format necessary for playing various media files and performs encoding or decoding on a media file by using a codec appropriate for a corresponding format. The resource manager 344 manages a resource such as source code, memory, or storage space of at least one application among the applications 370.

The power manager 345 manages a battery or power, for example, in operation with a basic input/output system (BIOS) and provides power information necessary for an operation of the electronic device. The database manager 346 performs a management operation to generate, search or change a database used for at least one application among the applications 370. The package manager 347 manages the installation or update of an application distributed in a package file format.

The connectivity manager 348 manages a wireless connection such as a WiFi or Bluetooth® connection. The notification manager 349 displays or notifies events such as arrival messages, appointments, and proximity alerts in a manner that is not disruptive to a user. The location manager 350 manages location information of an electronic device. The graphic manager 351 manages a graphic effect to be provided to a user or a user interface relating thereto. The security manager 352 provides a general security function necessary for system security or user authentication. According to an embodiment, if the electronic device (e.g., the electronic device 101) has a call function, the middleware 330 may further include a telephony manager for managing a voice or video call function of the electronic device.

The middleware 330 may include a middleware module forming a combination of various functions of the above-mentioned internal elements. The middleware 330 may provide modules specified according to types of OS so as to provide distinctive functions. Additionally, the middleware 330 may delete some of existing elements or add new elements dynamically.

The API 360 (e.g., the API 145) may be provided as a set of API programming functions with a different configuration according to the OS. In the case of Android® or iOS®, for example, one API set may be provided by each platform, and in the case of Tizen®, two or more API sets may be provided.

The application 370 (e.g., the application program 147) may include one or more applications capable of providing a function, for example, a home application 371, a dialer application 372, a short messaging service/multimedia messaging service (SMS/MMS) application 373, an instant message (IM) application 374, a browser application 375, a camera application 376, an alarm application 377, a contact application 378, a voice dial application 379, an e-mail application 380, a calendar application 381, a media player application 382, an album application 383, a clock application 384, a health care application (e.g., an application for measuring an exercise amount, a blood sugar, etc.), or an environment information providing application (e.g., an application for providing air pressure, humidity, or temperature information or the like).

According to an embodiment, the application 370 may include an application (hereinafter, an "information exchange application" for convenience) supporting information exchange between the electronic device (e.g., the electronic device 101) and an external electronic device (e.g., the electronic device 102 or 104). The information exchange application may include, for example, a notification relay application for transferring specific information to the external electronic device or a device management application for managing the external electronic device.

For example, the notification relay application may include a function for transferring notification information generated in another application (e.g., an SMS/MMS application, an e-mail application, a health care application, or an environment information application) of the electronic device to an external electronic device (e.g., the electronic device 102 or 104). The notification relay application may receive notification information from an external electronic device to provide the same to a user.

The device management application may manage (e.g., install, remove, or update) at least one function (e.g., turn on/turn off of an external electronic device itself (or a part thereof) or control of brightness (or resolution) of a display) of an external device (e.g., the electronic device 102 or 104) communicating with the electronic device, a service provided by an application operating in an external electronic device or provided by the external electronic device (e.g., a call service or a message service).

According to an embodiment, the application 37 may include an application (e.g., device health care application of mobile medical equipment) designated according to an attribute of the external electronic device (e.g., the electronic device 102 or 104). According to an embodiment, the application 37 may include an application received from the external electronic device (e.g., the server 106 or the electronic device 102 or 104). According to an embodiment, the application 370 may include a preloaded application or a third party application that may be downloaded from the server. Names of elements of the programming module 310 according to the illustrated embodiment may vary depending on a type of an OS.

According to various embodiments, at least a part of the programming module 310 may be implemented by software, firmware, hardware, or a combination of at least two of them. The at least a part of the programming module 310 may be implemented (e.g., executed) by a processor (e.g., the processor 210). The at least a part of the programming module 310 may include, for example, modules, programs, routines, sets of instructions, or processes for performing one or more functions.

According to an embodiment of the present disclosure, an electronic device includes a plurality of sensors and a processor, in which the processor determines a proximity state of an external object with respect to the electronic device, which indicates whether the external object exists around the electronic device, by using a first sensor set from among the plurality of sensors, determines a detailed proximity state of the external object with respect to the electronic device, which indicates whether the external object exists in a proximity region of the electronic device, by using a second sensor set from among the plurality of sensors if the external object is in a first proximity state with respect to the electronic device, and determines a detailed proximity state of the external object with respect to the electronic device by using a third sensor set from among the plurality of sensors if the external object is in a second proximity state with respect to the electronic device.

According to an embodiment of the present disclosure, an electronic device includes a plurality of sensors and a processor, in which the processor determines a proximity state of an external object with respect to the electronic device, which indicates whether the external object exists around the electronic device, by using at least one of the plurality of sensors in a first mode, determines a detailed proximity state of the external object with respect to the electronic device, which indicates whether the external object exists in a proximity region of the electronic device, by using the at least one sensor in a second mode if the external object is in a first proximity state with respect to the electronic device, and determines a detailed proximity state of the external object with respect to the electronic device by using the at least one sensor in a third mode if the external object is in a second proximity state with respect to the electronic device.

Figure 4:
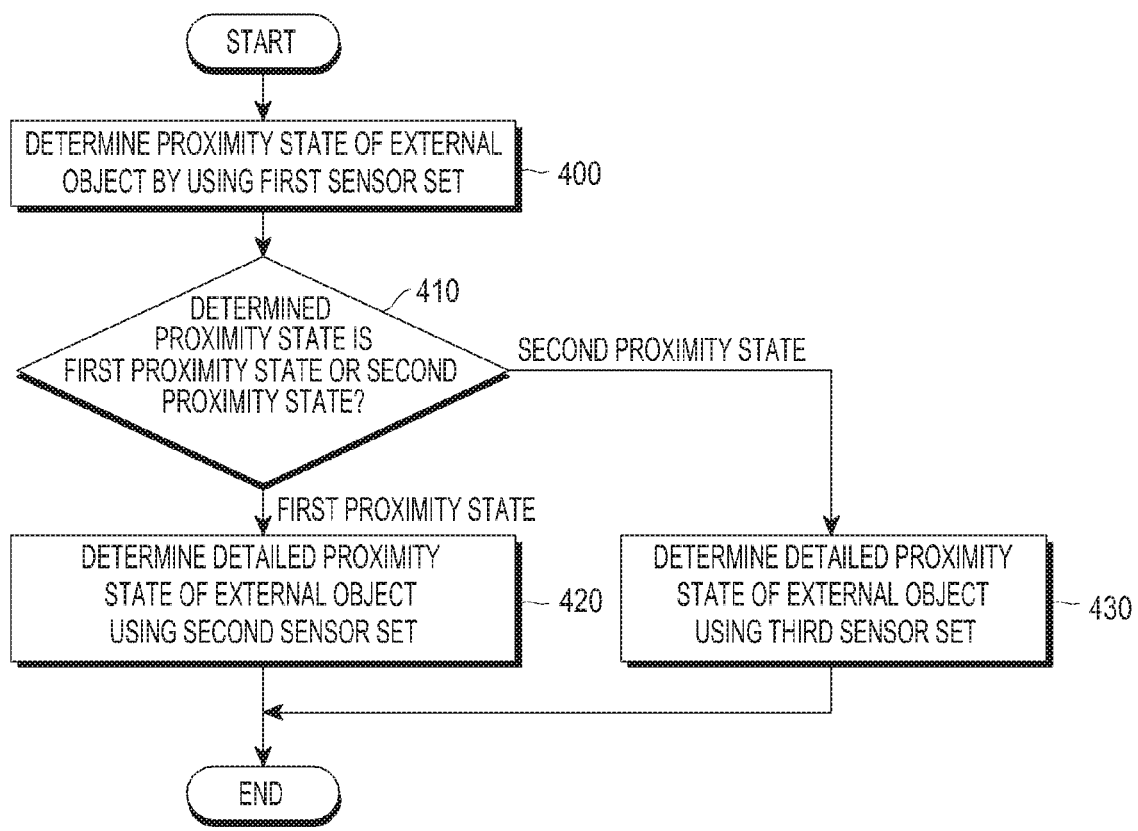
FIG. 4 is a flowchart illustrating a method for determining proximity of an external object by using at least one sensor according to various embodiments of the present disclosure.

FIG. 4 is a flowchart of a method for determining proximity of an external object by using at least one sensor according to various embodiments of the present disclosure. According to various embodiments, operations 400 to 430 may be performed by at least one of the electronic device 101, 104, or 201, the server 106, the processor 120 or 210, and the programming module 310.

Referring to FIG. 4, the electronic device 201 determines the proximity state of the external object by using the first sensor set in operation 400. For example, by using at least one of the camera module 291, the microphone 288, the antenna (not shown), and the acceleration sensor 240E, the proximity state of the external object may be determined.

In operation 410, the electronic device 201 determines whether the determined proximity state is the first proximity state or the second proximity state, performs operation 420 if the determined proximity state is the first proximity state, and performs operation 430 if the determined proximity state is the second proximity state. The first proximity state or the second proximity state may include a distance to the external object, the number of external objects, a type of the external object, and so forth. For example, the distance to the external object may include a distance in the first proximity region (e.g., 2 meters, etc.) of the external object, the second proximity region (e.g., 1 meter, etc.) of the external object, a hovering sensing region of the external object, contact of the external object and so forth. The number of external objects may be equal to or greater than 1. The types of the external object may include a user or an electronic device, a recognizable user or unrecognizable user, a recognizable device or unrecognizable device, and so forth.

For example, the first proximity state may mean a state in which a specific user or person is located in the first proximity region and the second proximity state may mean a state in which the specific user contacts the electronic device 201.

In operation 420, the electronic device 201 determines a detailed proximity state of the external object by using the second sensor set. For example, if the specific user is located in the first proximity region, the electronic device 201 may determine whether a face is recognized in a specific region in a scene obtained using the camera module 291 and determine that the user is in proximity to the electronic device 201 to use a function of the electronic device 201 if a face of the user is recognized. In another example, if the specific user is located in the first proximity region, the electronic device 201 determines detailed proximity of the external object based on a shake of the electronic device 201 measured using the acceleration sensor 240E, and determines that the user is in proximity to the electronic device 201 to use a function of the electronic device 201 if a voice of the user is recognized using at least one microphone 288.

In operation 430, the electronic device 201 determines a detailed proximity state of the external object by using the third sensor set. For example, if the specific user contacts the electronic device 201, the electronic device 201 senses a holding form by using the display 260 and determines that the user holds the electronic device 201 by hand to use a function of the electronic device 201 corresponding to the sensed holding form.

Figure 5:
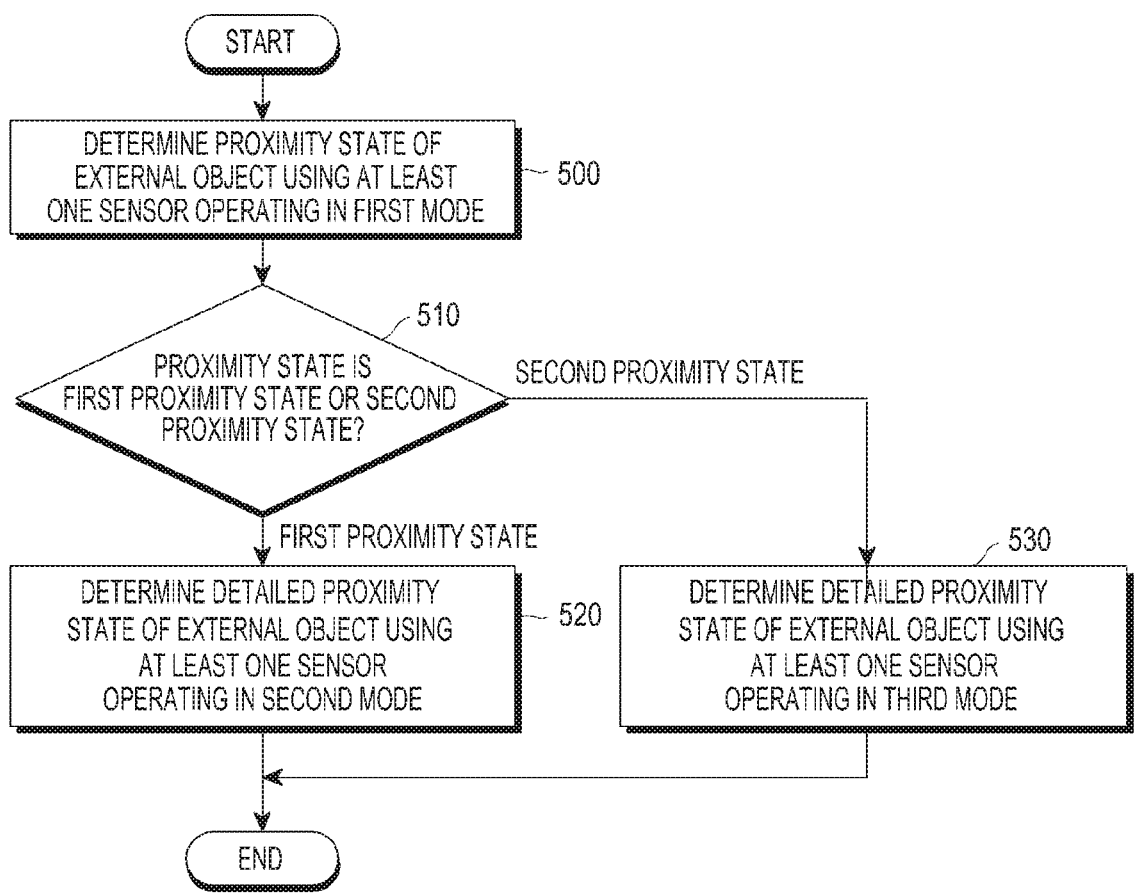
FIG. 5 is a flowchart illustrating a method for determining proximity of an external object by using at least one sensor in a plurality of modes according to various embodiments of the present disclosure.

FIG. 5 is a flowchart of a method for determining proximity of an external object by using at least one sensor in a plurality of modes according to various embodiments of the present disclosure. According to various embodiments, operations 500 to 530 may be performed by at least one of the electronic device 101, 104, or 201, the server 106, the processor 120 or 210, and the programming module 310.

In operation 500, the electronic device 201 determines a proximity state of the external object by using at least one sensor in the first mode. For example, the electronic device 201 analyzes an impulse signal input through one microphone to determine a location and a type of the external object and the number of external objects.

In operation 510, the electronic device 201 determines whether the determined proximity state is the first proximity state or the second proximity state, performs operation 520 if the determined proximity state is the first proximity state, and performs operation 530 if the determined proximity state is the second proximity state. For example, the electronic device 201 may analyze an impulse signal input through one microphone to determine whether the external object is located in the first proximity region or in the second proximity region or contacts the electronic device 201.

In operation 520, the electronic device 201 determines a detailed proximity state of the external object by using at least one sensor in the second mode. For example, the electronic device 201 may determine whether the external object is located in the second proximity region, based on an input time difference between a plurality of impulse signals input through a plurality of microphones, if the external object is located in the first proximity region.

In operation 530, the electronic device 201 determines a detailed proximity state of the external object by using at least one sensor in the third mode. For example, the electronic device 201 may perform iris or face recognition by using the camera module 291 if the external object is located in the second proximity region to determine whether the user is in the third proximity region in which the user may hold the electronic device 201 by hand.

Figure 6:
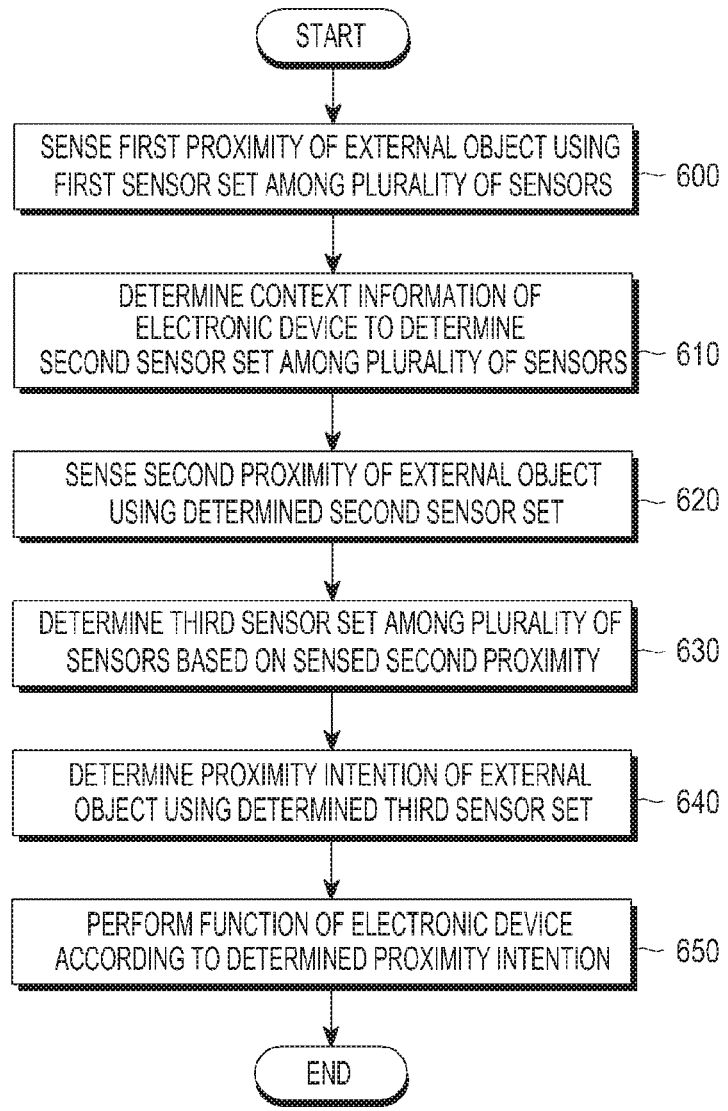
FIG. 6 is a flowchart illustrating a method for performing operations based on proximity of an external object by using at least one sensor according to various embodiments of the present disclosure.

FIG. 6 is a flowchart of a method for performing operations based on proximity of an external object by using at least one sensor according to various embodiments of the present disclosure. According to various embodiments, operations 600 to 650 may be performed by at least one of the electronic device 101, 104, or 201, the server 106, the processor 120 or 210, and the programming module 310.

In operation 600, the electronic device 201 senses first proximity of the external object by using the first sensor set among the plurality of sensors. For example, the electronic device 201 may determine whether the external object is located in the first proximity region, by using the microphone 288, the camera module 291, the antenna (not shown), the acceleration sensor 240E, and so forth.

In operation 610, the electronic device 201 determines context information of the electronic device 201 to determine the second sensor set among the plurality of sensors. For example, the electronic device 201 may determine location information, orientation state information, time information, and schedule information of the electronic device 201 to determine at least one of the display 260 and the camera module 291 as the second sensor set for sensing the second proximity of the external object.

In operation 620, the electronic device 201 senses second proximity of the external object by using the determined second sensor set. The second proximity may include a case where the external object is located in the second proximity region or in a hovering sensing region or contacts the electronic device 201.

For example, if the determined second sensor set includes the display 260, the electronic device 201 may determine whether the external object is located in the second proximity region by using a sensor pixel included in the display 260. For example, if the determined second sensor set includes the camera module 291, the electronic device 201 may recognize the external object in the scene input through the camera to determine whether the external object is located in the second proximity region.

In operation 630, the electronic device 201 determines the third sensor set among the plurality of sensors based on the sensed second proximity. According to an embodiment, if the external object is located in the second proximity region, the electronic device 201 senses detailed proximity of the external object to determine the third sensor set for determining proximity intention of the external object. For example, the electronic device 201 may determine at least one of the camera module 291 for iris recognition or face recognition, the input device 250 or the display 260 for sensing a form of holding the external object, the grip sensor 240E, and the proximity sensor 240f as the third sensor set for determining proximity intention of the external object.

In operation 640, the electronic device 201 determines proximity intention of the external object by using the determined third sensor set. According to an embodiment, the electronic device 201 determines whether the external object contacts the electronic device 201 and determines whether the proximity intention of the external object is for using a function of the electronic device 201. For example, if the iris or face is recognized using the camera module 291, the electronic device 201 may determine that the proximity intention of the external object is for user authentication. For instance, if the holding form of the external object is sensed through the input device 250 or the display 260 or proximity in the hovering sensing region is sensed through the grip sensor 240E or the proximity sensor 240F, then the electronic device 201 may determine that the proximity intention of the external object is for using a clock function, a call function, a message function, a photographing function, a music listening function, or the like.

In operation 650, the electronic device 201 performs a function of the electronic device 201 corresponding to the determined proximity intention. For example, if the iris or face is recognized, the electronic device 201 may perform user authentication according to whether the recognized iris or face matches a user's iris or face. For example, according to whether the sensed holding form matches preset holding forms, the electronic device 201 may perform a function of the electronic device 201 that is set corresponding to the matching holding form.

Figure 7:
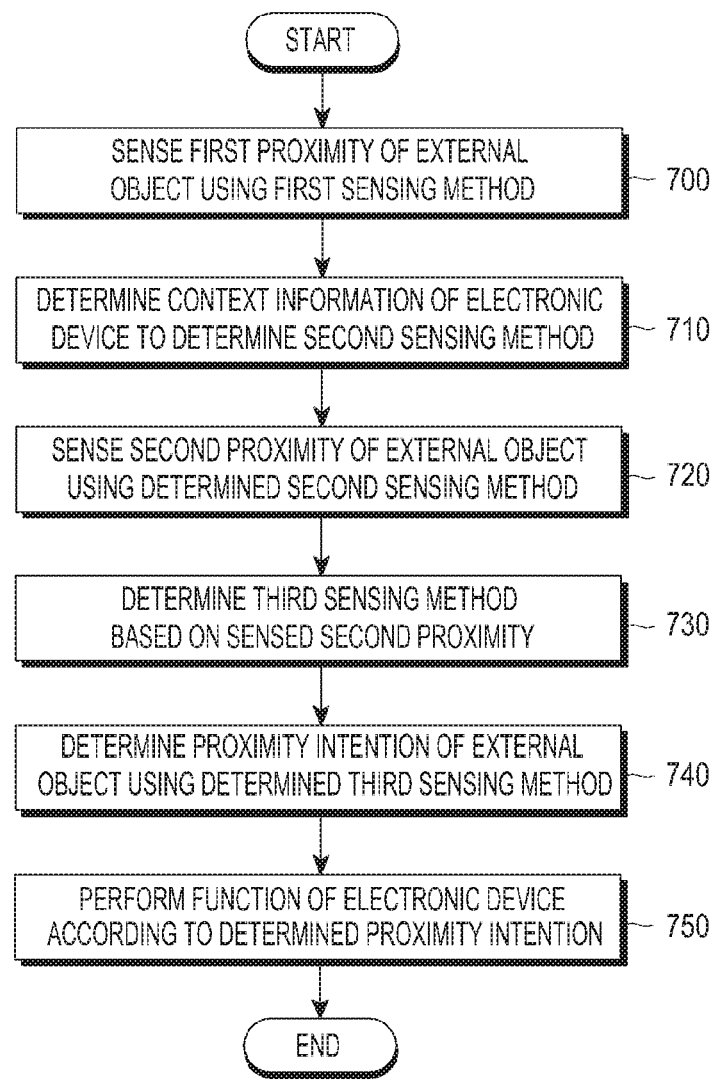
FIG. 7 is a flowchart illustrating a method for performing operations based on proximity of an external object by using at least one sensing method according to various embodiments of the present disclosure.

FIG. 7 is a flowchart of a method for performing operations based on proximity of an external object by using at least one sensing method according to various embodiments of the present disclosure. According to various embodiments, operations 700 to 750 may be performed by at least one of the electronic device 101, 104, or 201, the server 106, the processor 120 or 210, and the programming module 310.

In operation 700, the electronic device 201 senses first proximity of the external object by using the first sensing method. For example, the electronic device 201 may receive an impulse signal with respect to an external object by using one microphone, analyze the received impulse signal, and determine that the external object is located in the first proximity region if the received impulse signal is a waveform over a specific sound pressure, a pattern that is the same as a preset threshold pattern, or an impulse signal over a predetermined number of times.

In operation 710, the electronic device 201 determines the context information of the electronic device 201 to determine the second sensing method. For example, if the orientation of the electronic device 201 is less than a threshold orientation value, the electronic device 201 may determine that the electronic device 201 is placed in a particular location and determine a sensing method using a plurality of microphones as the second sensing method.

In operation 720, the electronic device 201 senses second proximity of the external object by using the determined second sensing method. For example, the electronic device 201 may analyze impulse signals input through a plurality of microphones and determine a location or moving path of the external object by using an input time difference between times when the impulse signals are input.

In operation 730, the electronic device 201 determines the third sensing method for determining proximity intention of the external object based on the sensed second proximity.

According to an embodiment, the electronic device 201 senses detailed proximity (e.g., contact or hovering of the external object) to determine the proximity intention, if the location of the external object is in the second proximity region. To sense the detailed proximity, the electronic device 201 may sense the detailed proximity of the external object by using one or two or more sensors.

For example, if the location of the sensed external object is included in the second proximity region, the electronic device 201 may determine iris recognition or face recognition using the camera module 291 as the third sensing method to sense the detailed proximity of the external object. For example, the electronic device 201 may also determine a method of using the touch panel 262 for sensing a holding form of the external object as well as the camera module 291 as the third sensing method.

In operation 740, the electronic device 201 determines proximity intention of the external object by using the determined third sensing method. For example, if the iris or face is recognized in a scene input through the camera module 291, the electronic device 201 may determine that the proximity intention of the external object is for user authentication. For example, In operation 750, the electronic device 201 performs a function of the electronic device 201 corresponding to the determined proximity intention. For example, the electronic device 201 may perform user authentication with respect to the external object based on the recognized iris or face.

The above-described methods for sensing the external object are not limited to methods for sensing the first proximity and methods for sensing second proximity, and the methods for sensing the first proximity may be used for sensing the second proximity or vice versa.

According to another embodiment of the present disclosure, a method for operating an electronic device includes sensing first proximity of an external object with respect to the electronic device by using a first sensor included in the electronic device, determining a second sensor by using context information of the electronic device, sensing second proximity of the external object with respect to the electronic device by using the determined second sensor, and performing a function of the electronic device based on the sensed second proximity.

Figure 8C:
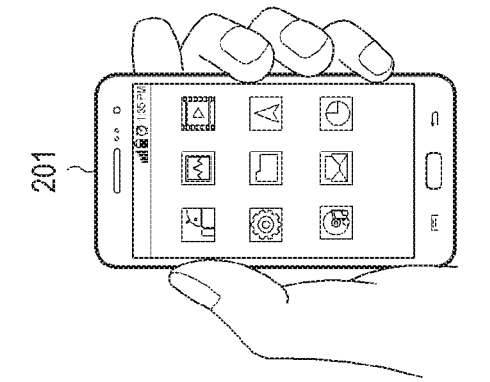
FIGS. 8A, 8B and 8C illustrate examples for describing an operation of sensing proximity of an external object and unlocking a lock screen according to various embodiments of the present disclosure.
Figure 8B:
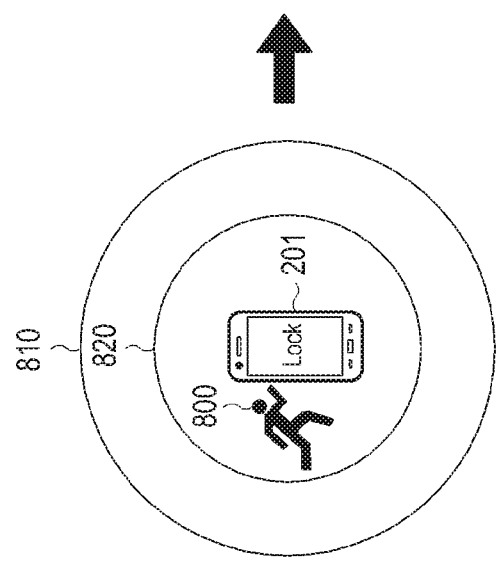
Figure 8A:
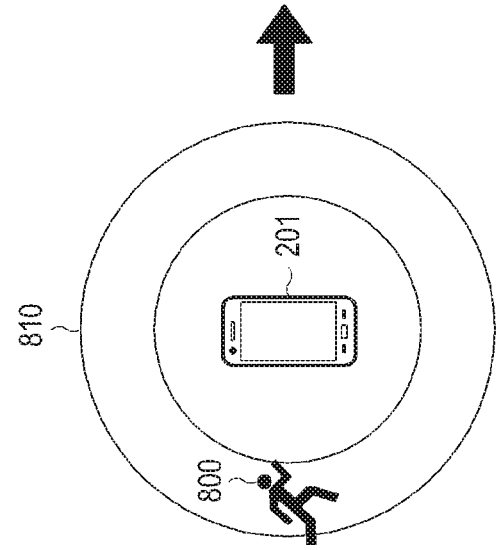

FIGS. 8A, 8B and 8C illustrate examples for describing an operation of sensing proximity of an external object and unlocking a lock screen according to various embodiments of the present disclosure.

According to various embodiments, if sensing that the user is in the second proximity region in a sleep mode, the electronic device 201 switches to an active mode to display a lock screen on the display 260 and performs user authentication using face or iris recognition, contact, grip, or the like to display an unlock screen. The sleep mode may mean a state where the electronic device 201 supplies power only to components for performing minimum operations and does not supply power to the other components. The active mode may mean a state where the power is supplied to every component of the electronic device 201.

Referring FIGS. 8A, 8B, the electronic device 201 determines whether a user 800 is situated in a first proximity region 810 by using the first sensor set. If the user 800 is situated in the first proximity region 810, the electronic device 201 determines the second sensor set for sensing the second proximity of the user 800 and determines whether the user 800 is situated in a second proximity region 820 by using the determined second sensor set.

For example, the electronic device 201 may determine whether the user 800 is situated in the first proximity region 810 by using a first camera. If the user 800 is situated in the first proximity region 810, the electronic device 201 determines a location of the user 800 by using the first camera to determine whether the user 800 is situated in a second proximity region 820. If the user 800 is situated in the second proximity region 820, the electronic device 201 recognizes an iris or face of the user 800 by using a second camera to perform user authentication. If the recognized user 800 is identified as a registered user of the electronic device 201, the electronic device 201 unlocks the lock screen to display a background screen of the electronic device 201 on the display 260 as shown in FIG. 8C.

If the user 800 is situated in the second proximity region 820, the electronic device 201 determines whether the user 800 is in a region for iris recognition and performs iris authentication by driving the second camera if the user 800 is situated in the region for iris recognition. If the user 800 is not situated in the region for iris recognition, the electronic device 201 may not drive the second camera.

For example, the electronic device 201 may sense whether the user 800 is situated in the second proximity region 820, and if a touch on the electronic device 201 is sensed using the touch panel 252, the gyro sensor 240B, the acceleration sensor 240E, or the like, the electronic device 201 may unlock the lock screen to display the background screen of the electronic device 201 on the display 260 as shown in FIG. 8C. To sense the detailed proximity of the user 800 for using the electronic device 201, the electronic device 201 determines information such as a grip form of the user 800 with respect to the electronic device 201, a posture of the electronic device 201, and a gaze of the user 800, and in response to determining that the proximity of the user 800 is for using the electronic device 201, the electronic device 201 may unlock the lock screen.

Figure 9:
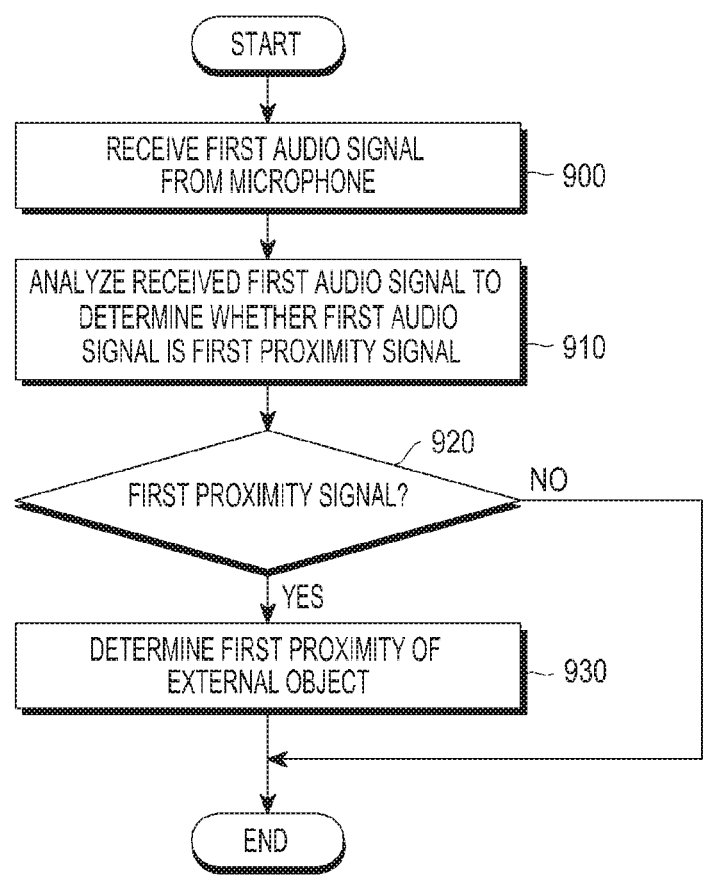
FIG. 9 is a flowchart illustrating a method for determining first proximity of an external object by using a microphone according to various embodiments of the present disclosure.

FIG. 9 is a flowchart of a method for determining first proximity of an external object by using a microphone according to various embodiments of the present disclosure. According to various embodiments, operations 900 to 930 may be performed by at least one of the electronic device 101, 104, or 201, the server 106, the processor 120 or 210, and the programming module 310.

In operation 900, the electronic device 201 receives the first audio signal from the microphone 288. For example, the first audio signal may be an audio signal including footstep sound with respect to at least one user.

In operation 910, the electronic device 201 analyzes the received audio signal to determine whether the received first audio signal is the first proximity signal.

In operation 920, the electronic device 201 performs operation 930 if the first audio signal is the first proximity signal and terminates an operation if the first audio signal is not the first proximity signal. According to an embodiment, the electronic device 201 analyzes the first audio signal by using a filter designed based on analysis of frequency characteristics of the footstep sound and detects the footstep sound among various surrounding sounds. The electronic device 201 determines whether the audio signal corresponding to the detected footstep sound is a waveform over a specific sound pressure stored in the memory 230, an identical pattern, or an impulse signal over a predetermined number of times, and determines proximity of the external object if the audio signal is a waveform over the specific sound pressure, the identical pattern, or the impulse signal over the predetermined number of times. This will be described in detail below with reference to FIG. 10.

Figure 10A:
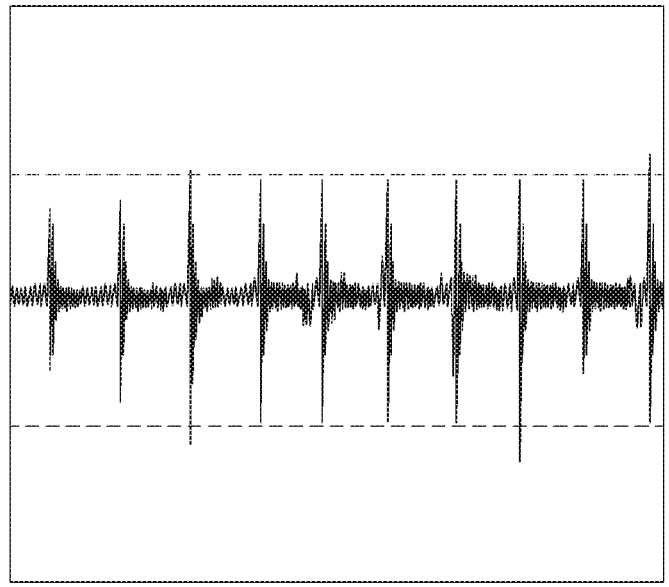
FIGS. 10A and 10B illustrate examples for describing impulse signals according to various embodiments of the present disclosure.
Figure 10B:
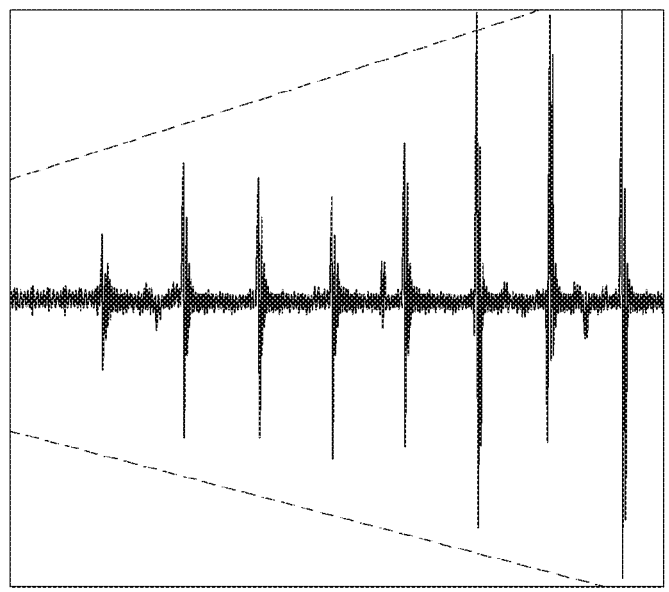

FIGS. 10A and 10B illustrate examples for describing impulse signals according to various embodiments of the present disclosure.

Referring to FIGS. 10A and 10B, an impulse signal corresponding to user's footstep sound may be illustrated as shown in FIG. 10A, and an impulse signal corresponding to the footstep sound of the user approaching the electronic device 201 may be illustrated as shown in FIG. 10B. If the audio signal corresponding to the footstep sound matches the impulse signal shown in FIG. 10B, the electronic device 201 determines the first audio signal as the first proximity signal.

In operation 930, the electronic device 201 determines the first proximity of the external object. For example, if the audio signal corresponding to the footstep sound matches the impulse signal shown in FIG. 10B, the electronic device 201 determines that the external object is located in the first proximity region.

Figure 11:
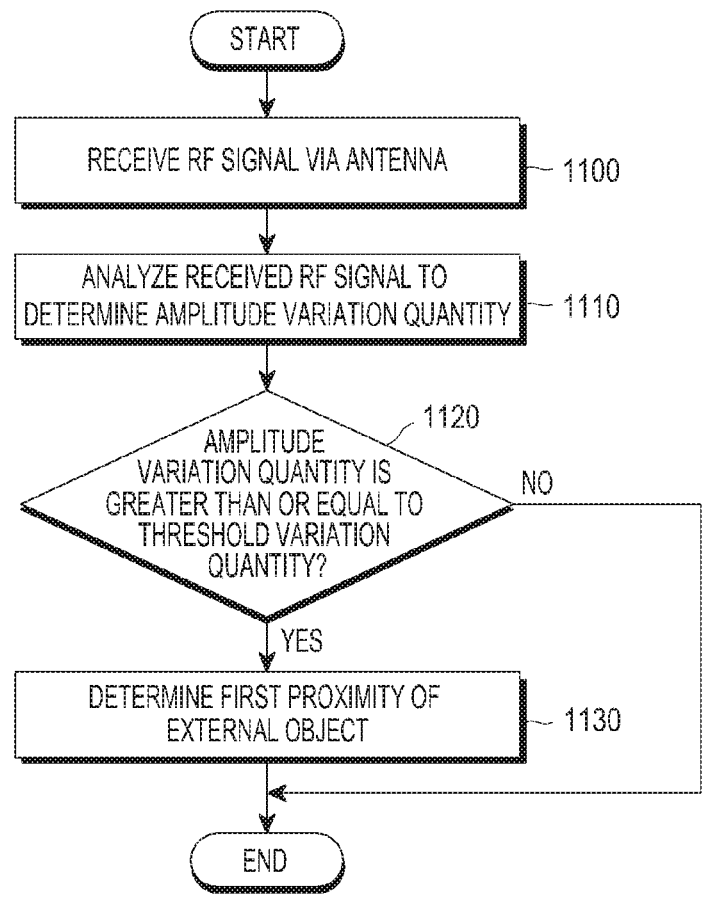
FIG. 11 is a flowchart illustrating a method for determining first proximity of an external object by using an antenna according to various embodiments of the present disclosure.

FIG. 11 is a flowchart of a method for determining first proximity of an external object by using an antenna according to various embodiments of the present disclosure. According to various embodiments, operations 1100 to 1130 may be performed by at least one of the electronic device 101, 104, or 201, the server 106, the processor 120 or 210, and the programming module 310.

According to various embodiments, the electronic device 201 senses a change of a neighboring broadcast signal or cellular signal, which occurs when the external object is in proximity to the electronic device 201, and compares the sensed signal change with a unique signal change corresponding to proximity to sense the proximity of the external object. For example, a method for recognizing proximity of the external object by using the cellular signal or the like, which may sense a change of a signal from a received signal strength indicator (RSSI), a channel quality indicator (CQI), etc., by using the communication module 220 included in the electronic device 201.

Referring to FIG. 11, in operation 1100, the electronic device 201 receives a radio frequency (RF) signal via an antenna.

In operation 1110, the electronic device 201 analyzes the received RF signal to determine an amplitude variation quantity.

In operation 1120, the electronic device 201 determines whether the determined amplitude variation quantity is greater than or equal to a threshold variation quantity. If the amplitude variation quantity is greater than or equal to the threshold variation quantity, the electronic device 201 performs operation 1130; otherwise, if the amplitude variation quantity is less than the threshold variation quantity, the electronic device 201 terminates an operation.

In operation 1130, the electronic device 201 determines the first proximity of the external object. For example, the electronic device 201 may determine that the external object is located in the first proximity region if the amplitude variation quantity is greater than or equal to the threshold variation.

Figure 12:
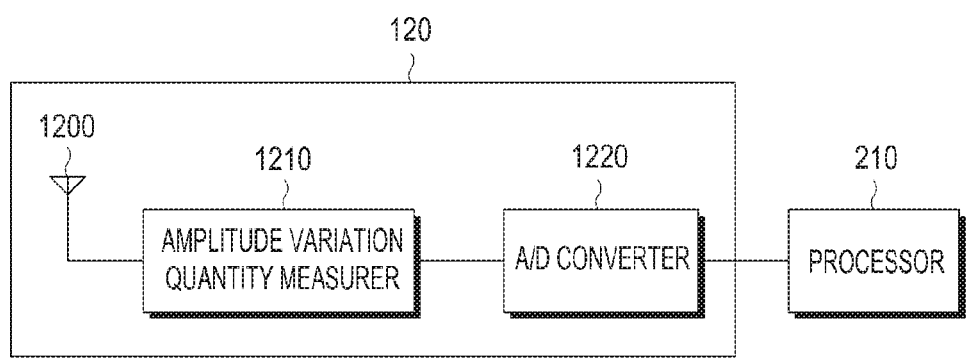
FIG. 12 is a structural diagram illustrating an antenna module according to various embodiments of the present disclosure.

FIG. 12 is a structural diagram of an antenna module according to various embodiments of the present disclosure.

Referring to FIG. 12, the antenna module 120 may include an amplitude variation measurer 1210 and an analog-to-digital (A/D) converter 1220 in an antenna I/O stage 1200 thereof.

The amplitude variation measurer 1210 may include a plurality of detectors for detecting an amplitude variation quantity of an analog signal input from the antenna I/O stage 1200. For example, the amplitude variation measurer 1210 may include an envelope detector.

The A/D converter 1220 converts the detected amplitude variation quantity into a digital signal and outputs the digital signal to the processor 210.

The processor 210 compares the input digital signal with a pattern of a signal stored in the memory 230. If the input digital signal matches the stored signal pattern, the processor 210 determines that the external object is in the first proximity region.

Figure 13:
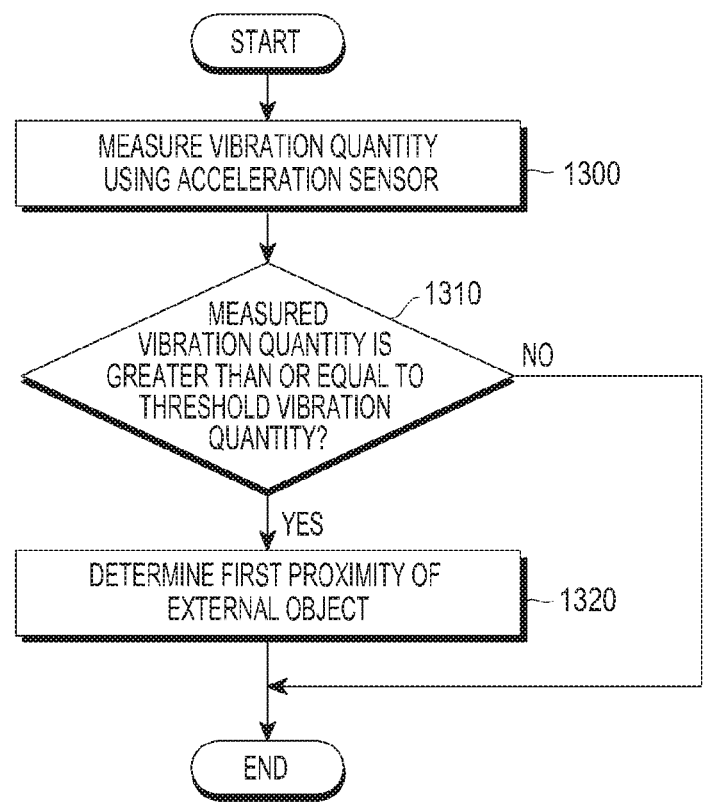
FIG. 13 is a flowchart illustrating a method for determining first proximity of an external object by using an acceleration sensor according to various embodiments of the present disclosure.

FIG. 13 is a flowchart of a method for determining first proximity of an external object by using an acceleration sensor according to various embodiments of the present disclosure. According to various embodiments, operations 1300 to 1320 may be performed by at least one of the electronic device 101, 104, or 201, the server 106, the processor 120 or 210, and the programming module 310.

Referring to FIG. 13, in operation 1300, the electronic device 201 measures a vibration quantity of the electronic device 201 by using the acceleration sensor 240E. According to various embodiments, the acceleration sensor 240E may be a trip-axis acceleration sensor of an x axis, a y axis, and a z axis. The acceleration sensor 240E may further include a vibration monitoring module therein to monitor nearby proximity vibration. The electronic device 201 monitors the nearby proximity vibration by using some of the three axes of the acceleration sensor 240E to reduce current consumption of the electronic device 201.

In operation 1310, the electronic device 201 determines whether the measured vibration quantity is greater than or equal to a threshold vibration quantity. If the vibration quantity is greater than or equal to a threshold variation quantity, the electronic device 201 performs operation 1320; otherwise, if the vibration quantity is less than the threshold vibration quantity, the electronic device 201 terminates an operation.

In operation 1320, the electronic device 201 determines the first proximity of the external object. For example, the electronic device 201 may determine that the external object is located in the first proximity region if the measured vibration quantity is greater than or equal to the threshold vibration quantity.

According to various embodiments, the electronic device 201 monitors a proximity vibration quantity by using the acceleration sensor 240E and switches the processor 210 to the sleep mode if a proximity vibration quantity over the threshold vibration quantity is measured.

According to various embodiments, the electronic device 201 selects some of the three axes of the acceleration sensor 240E and monitors the proximity vibration quantity by using the selected axes. For example, the electronic device 201 turns off a high-pass filter included in the acceleration sensor 240E to determine an orientation of the electronic device 201 and selects some axes for monitoring based on the determined orientation. Once some axes are selected, the electronic device 201 turns on the high-pass filter included in the acceleration sensor 240E and monitors the vibration quantity. Some of the three axes may be turned on or off by selection of the processor 210 or may be selected when the acceleration sensor 240E starts measuring the vibration quantity.

According to various embodiments, the electronic device 201 measures proximity vibration by turning off a particular filter of the acceleration sensor 240E and using a method for reducing a sampling rate to monitor low-power proximity vibration, and if the proximity vibration is sensed, the electronic device 201 performs monitoring by turning on the particular filter or increasing the sampling rate.

Figure 14:
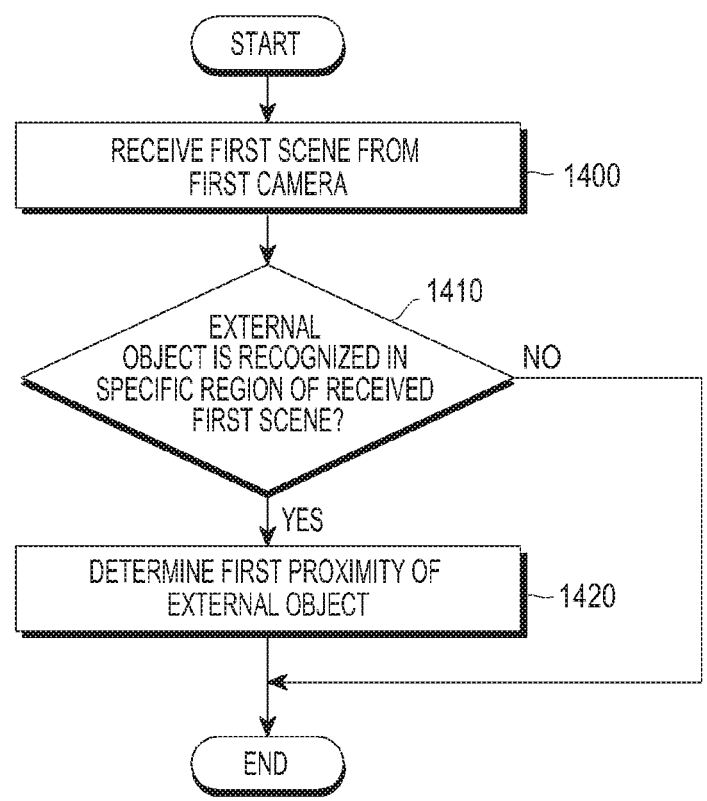
FIG. 14 is a flowchart illustrating a method for determining first proximity of an external object by using a camera module according to various embodiments of the present disclosure.

FIG. 14 is a flowchart of a method for determining first proximity of an external object by using a camera module according to various embodiments of the present disclosure. According to various embodiments, operations 1400 to 1420 may be performed by at least one of the electronic device 101, 104, or 201, the server 106, the processor 120 or 210, and the programming module 310.

According to an embodiment, the camera module 291 may include a first camera.

Referring to FIG. 14, in operation 1400, the electronic device 201 receives a first scene from the first camera.

In operation 1410, the electronic device 201 determines whether the external object is recognized in a specific region in the received first scene, and performs operation 1420 if the external object is recognized in the specific region and terminates an operation if the external object is not recognized in the specific region.

In operation 1420, the electronic device 201 determines the first proximity of the external object. For example, the electronic device 201 may determine that the external object is located in the first proximity region if the external object is recognized in the specific region.

Figure 15A:
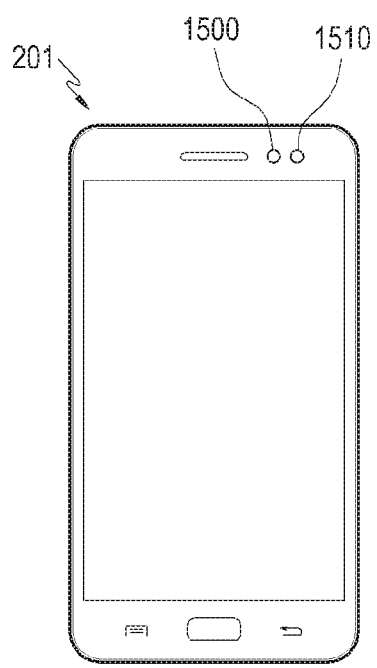
FIGS. 15A and 15B illustrate examples for describing a method for determining first proximity of an external object by using a front camera according to various embodiments of the present disclosure.
Figure 15B:
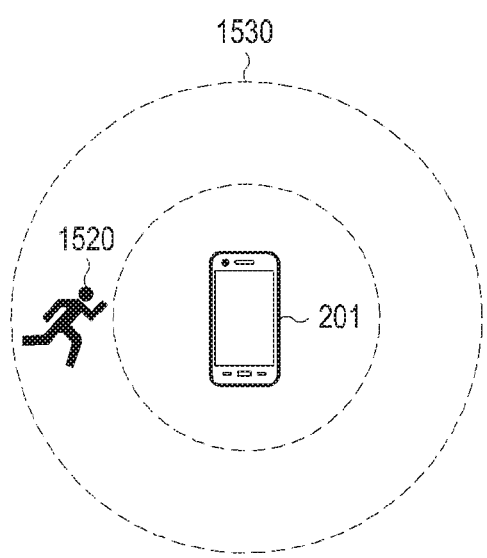

FIGS. 15A and 15B illustrate examples for describing a method for determining first proximity of an external object by using a front camera according to various embodiments of the present disclosure.

Referring to FIG. 15A, the electronic device 201 may include two cameras (e.g., a first camera 1500 and a second camera 1510) on a front top end portion and analyzes the first scene input through the first camera 1500 to determine whether an external object 1520 is located in a first proximity region 1530 as shown in FIG. 15B. The first camera 1500 may have a wider viewing angle than the second camera 1510.

As such, to determine the first proximity of the external object, the electronic device 201 determines whether the external object is in proximity to the electronic device 201 by using at least one sensor with low power and determines detailed proximity of the external object by using at least one sensor to improve proximity accuracy after the first proximity.

Figure 16:
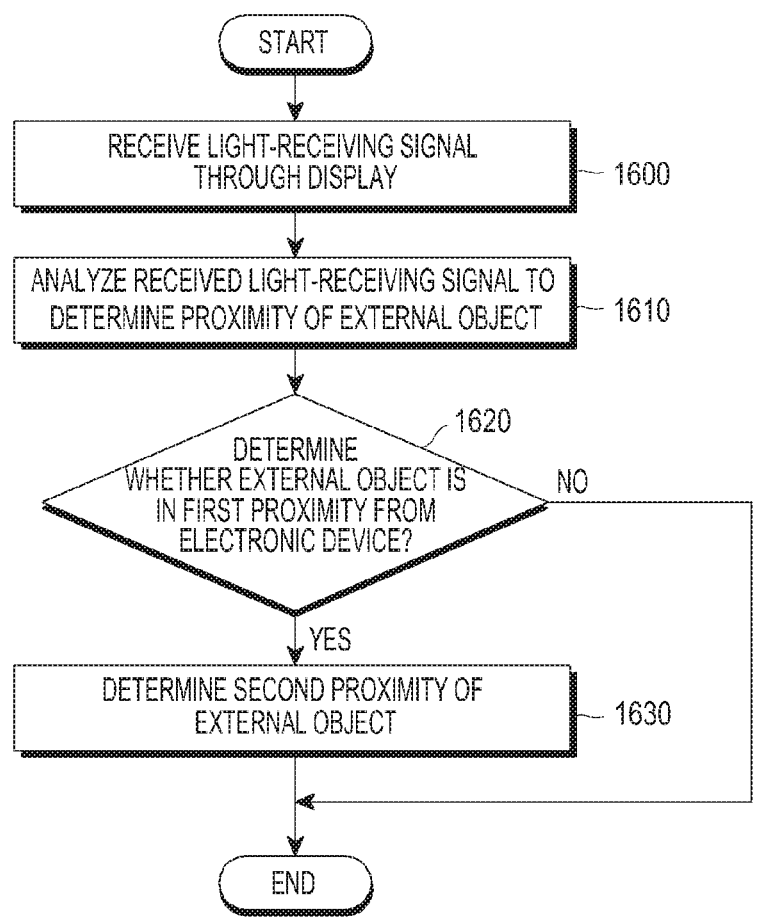
FIG. 16 is a flowchart illustrating a method for determining second proximity of an external object by using a display according to various embodiments of the present disclosure.

FIG. 16 is a flowchart of a method for determining second proximity of an external object by using a display according to various embodiments of the present disclosure. According to various embodiments, operations 1600 to 1630 may be performed by at least one of the electronic device 101, 104, or 201, the server 106, the processor 120 or 210, and the programming module 310.

According to various embodiments, by using various sensors for sensing detailed proximity of the external object, the electronic device 201 determines whether the external object is located in the second proximity region to use the electronic device 201.

Referring to FIG. 16, in operation 1600, the electronic device 201 receives a light-receiving signal through the display 260. The panel 262 of the display 260 may include a sensor-in-pixel including RGB pixels and sensing pixels for receiving the light-receiving signal.

In operation 1610, the electronic device 201 analyzes the received light-receiving signal to determine whether the external object is in proximity. For example, the electronic device 201 may determine whether a received light-receiving quantity is less than a preset threshold light-receiving quantity.

In operation 1620, the electronic device 201 performs operation 1630 if determining that the external object is in proximity and terminates an operation if determining that the external object is not in proximity. For example, if the received light-receiving quantity is less than the threshold light-receiving quantity, the electronic device 201 may determine that the external object is in proximity and perform operation 1620; otherwise, if the received light-receiving quantity is greater than or equal to the threshold light-receiving quantity, the electronic device 201 may determine that the external object is not in proximity and terminate operations.

In operation 1630, the electronic device 201 determines the second proximity of the external object. For example, the electronic device 201 may determine that the external object is located in the second proximity region if the received light-receiving quantity is less than the threshold light-receiving quantity.

Figure 17A:
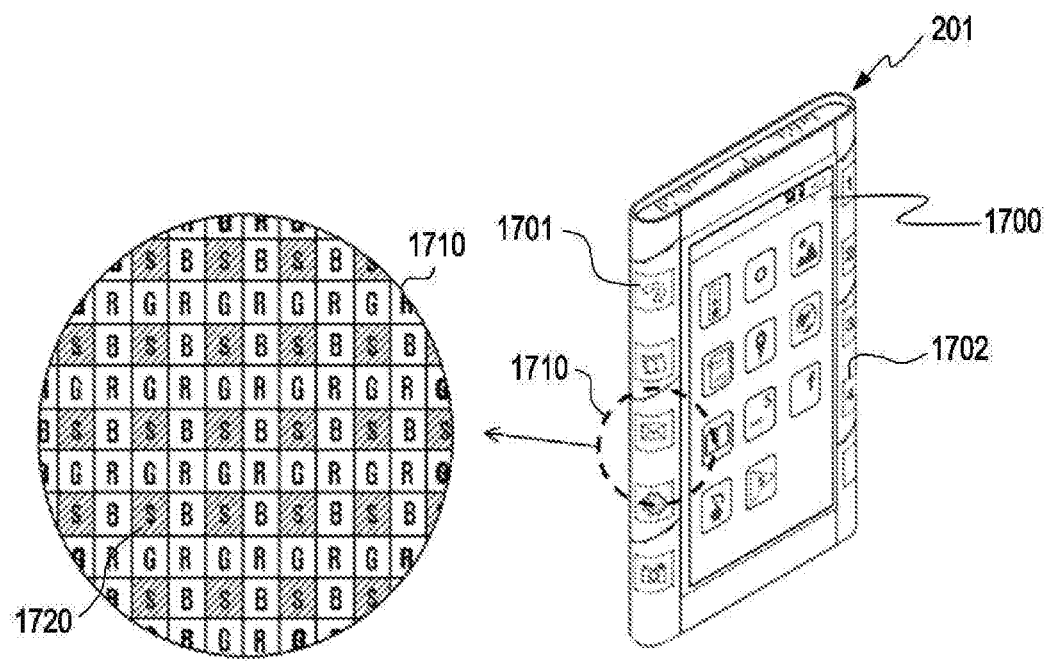
FIGS. 17A and 17B illustrate examples for describing a method for determining second proximity of an external object by using a display according to various embodiments of the present disclosure.
Figure 17B:
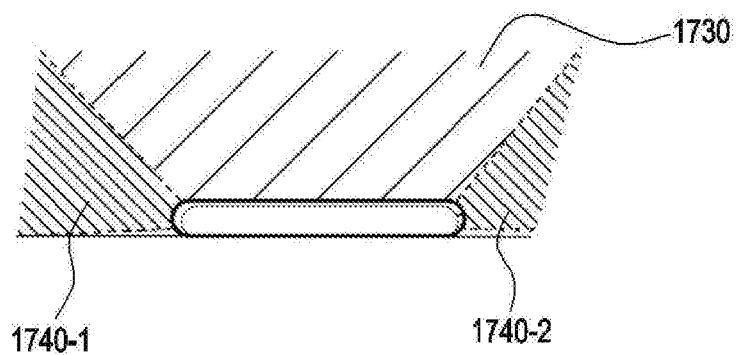

FIGS. 17A and 17B illustrate examples for describing a method for determining second proximity of an external object by using a display according to various embodiments of the present disclosure.

Referring to FIG. 17A, the electronic device 201 may further include a front display 1700 and side displays 1701 and 1702 on both sides of the front display 1700, and the front display 1700 and the side displays 1701 and 1702 may include sensors in pixel. The side display 1701 may include an RGB pixel 1710 and a sensing pixel 1720. The sensing pixel 1720 receives a nearby light-receiving signal, measures a light-receiving quantity, generates an image pattern corresponding to the measured light-receiving quantity, and senses proximity or motion (e.g., a form of holding the electronic device 201 by the user) according to the generated image pattern. The sensing pixel 1720 may be driven independently of a light-emitting pixel (e.g., RGB pixels). For example, if the front display 1700 and the side displays 1701 and 1702 are turned off, the electronic device 201 may analyze a light-receiving signal input through a sensing pixel and measure a light-receiving quantity.

Thus, the electronic device 201 may receive a light-receiving signal not only from a first region 1730 through the front display 1700 but also from second regions 1740-1 and 1740-2 through the side displays 1701 and 1702 as shown in FIG. 17B.

Figure 18:
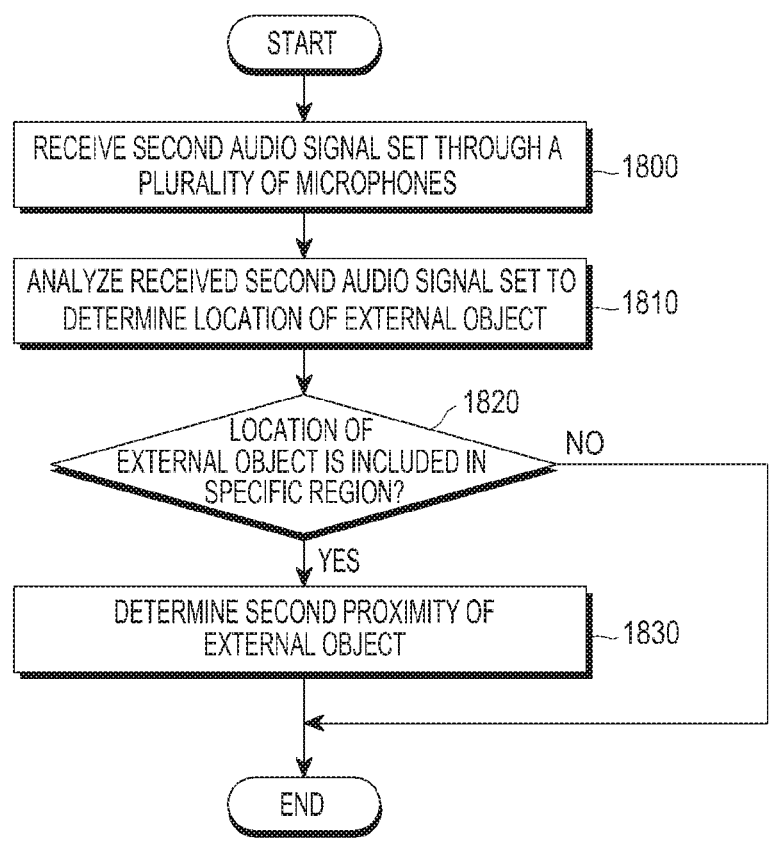
FIG. 18 is a flowchart illustrating a method for determining second proximity of an external object by using a plurality of microphones according to various embodiments of the present disclosure.

FIG. 18 is a flowchart of a method for determining second proximity of an external object by using a plurality of microphones according to various embodiments of the present disclosure. According to various embodiments, operations 1800 to 1830 may be performed by at least one of the electronic device 101, 104, or 201, the server 106, the processor 120 or 210, and the programming module 310.

Referring to FIG. 18, in operation 1800, the electronic device 201 receives a second audio signal set through a plurality of microphones. For example, the plurality of microphones may include three microphones from which three audio signals may be received respectively.

In operation 1810, the electronic device 201 analyzes the received second audio signal set to determine a location of the external object. For example, a proximity impulse signal may be extracted by analyzing three audio signals and a location of the external object may be determined based on the extracted proximity impulse signal.

In operation 1820, the electronic device 201 determines whether the measured location of the external object is included in a specific region; if determining that the location of the external object is included in the specific region, the electronic device 201 performs operation 1830 and otherwise, if determining that the location of the external object is not included in the specific region, the electronic device 201 terminates an operation.

In operation 1830, the electronic device 201 determines the second proximity of the external object. For example, the electronic device 201 may determine that the external object is located in the second proximity region to use the electronic device 201 if the measured location of the external object is included in a specific region.

FIGS. 19A and 19B illustrate examples for describing a method for determining second proximity of an external object by using a plurality of microphones according to various embodiments of the present disclosure.

Referring to FIGS. 19A and 19B, the electronic device 201 may include a first microphone 1901, a second microphone 1902, and a third microphone 1903. If a user 1900 approaches the electronic device 201, the electronic device 201 receives the first audio signal corresponding to proximity of the user 1900 through the first microphone 1901, receives the second audio signal through the second microphone 1902, and receives the third audio signal through the third microphone 1903. The electronic device 201 analyzes the received first audio signal, second audio signal, and third audio signal to extract an impulse signal corresponding to footstep sound.

Depending on a location of each microphone, the first audio signal input to the first microphone 1901, the second audio signal input to the second microphone 1902, and the third audio signal input through the third microphone 1903 may have differences in reception times therebetween. For example, the electronic device 201 may calculate a location of the user 1900 (e.g., a location of a specific distance in a 12 o'clock direction, a location of a specific distance in a 3 o'clock direction, a moving path of the user 1900, etc.) by using a reception time difference between impulse signals corresponding to footstep sound of an audio signal received through each microphone.

Figure 20:
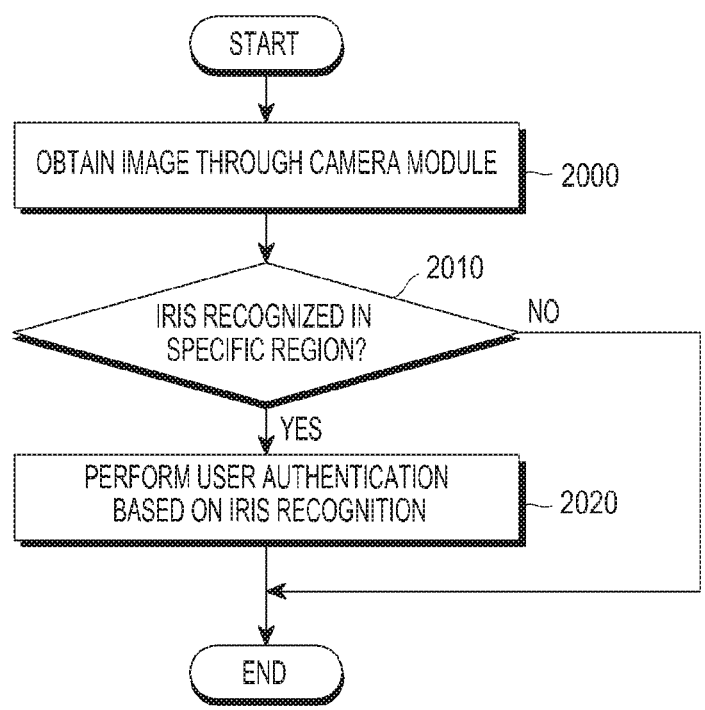
FIG. 20 is a flowchart illustrating a method for determining proximity intention of an external object based on iris recognition by using a camera module according to various embodiments of the present disclosure.

FIG. 20 is a flowchart of a method for determining proximity intention of an external object based on iris recognition by using a camera module according to various embodiments of the present disclosure. According to various embodiments, operations 2000 to 2020 may be performed by at least one of the electronic device 101, 104, or 201, the server 106, the processor 120 or 210, and the programming module 310.

Referring to FIG. 20, in operation 2000, the electronic device 201 obtains an image through the camera module 291.

In operation 2010, the electronic device 201 determines whether an iris is recognized in a specific region in the obtained image, and performs operation 2020 if the iris is recognized in the specific region and terminates an operation if the iris is not recognized in the specific region.

In operation 2020, the electronic device 201 performs user authentication based on iris recognition. For example, if the iris is recognized, the electronic device 201 may determine that the proximity intention of the external object is for user authentication. The electronic device 201 compares the recognized iris pattern with a previously stored iris pattern and if the recognized iris pattern matches the previously stored iris pattern, the electronic device 201 recognizes the external object as the user of the electronic device 201.

Figure 21B:
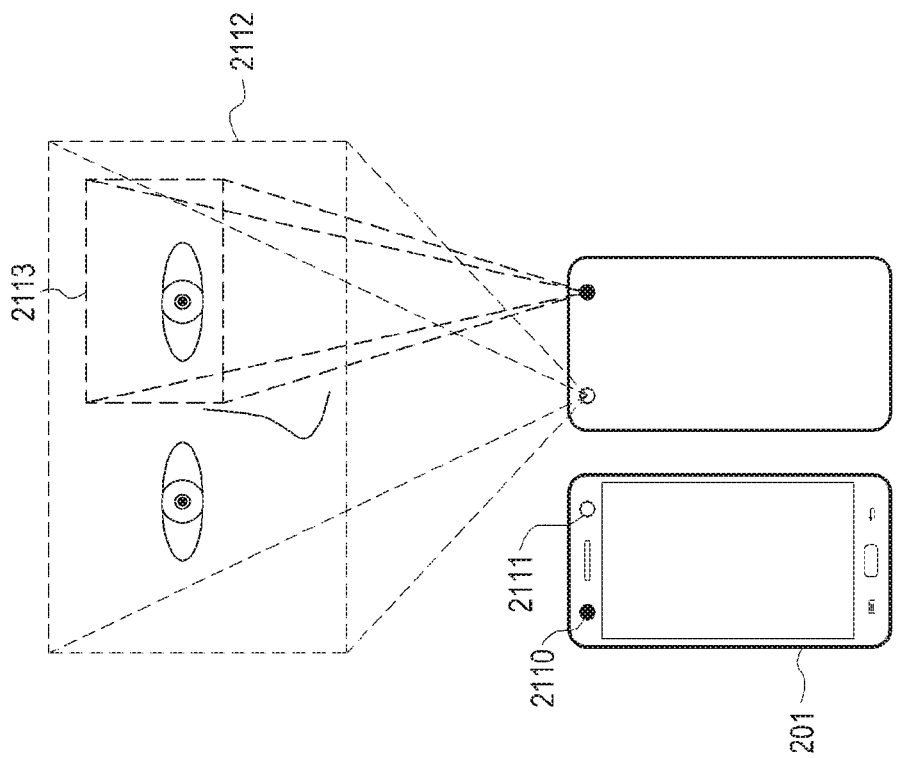
FIGS. 21A and 21B illustrate examples for describing a method for determining proximity intention of an external object by using a camera module according to various embodiments of the present disclosure.
Figure 21A:
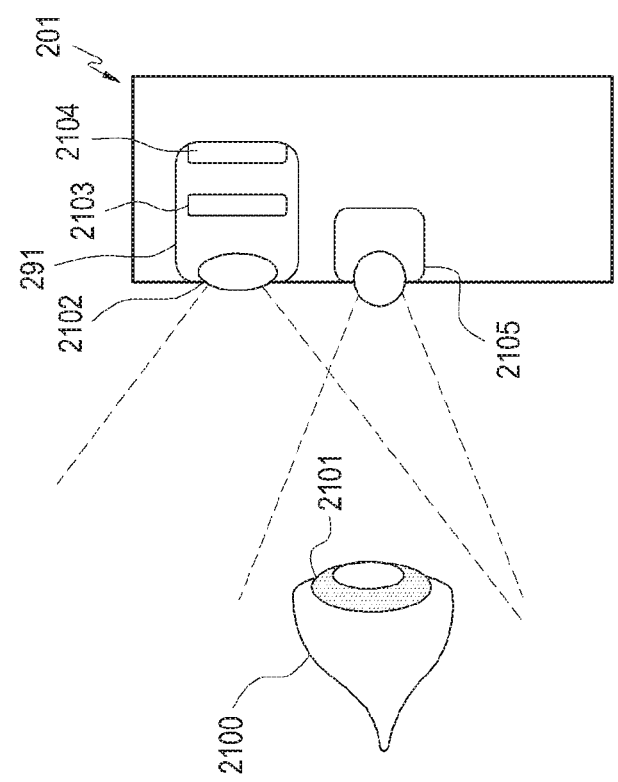

FIGS. 21A and 21B illustrate examples for describing a method for determining proximity intention of an external object by using a camera module according to various embodiments of the present disclosure.

Referring to FIG. 21A, the electronic device 201 may include the camera module 291 for iris authentication. The camera module 291 may include a lens 2102, a bandpass filter 2103, and an image sensor 3104, and may further include an infrared emitting diode (IRED) 2105 and an LED driver (not shown).

The lens 2102 receives a light signal corresponding to an iris 2101 of a user eye 2100 and the received light signal passes through the bandpass filter 2103. If the light signal having a wavelength in a specific band is input to the image sensor 2104, the image sensor 2104 converts the light signal into a digital signal.

The IRED 2105 emits light having a specific wavelength under control of the LED driver, and thus reflected light is input through the camera module 291. The IRED 2105 may include an IRED capable of emitting light of continuous waves or an IRED capable of emitting light as pulses in synchronization with an input frame of an image sensor.

Thus, the bandpass filter 2103 outputs a light signal having a wavelength range including at least a part of a specific wavelength range emitted through the IRED 2105. For example, if the IRED 2105 emits light of a wavelength range of about 850 nm+/−50 nm, the bandpass filter 2103 selectively passes the light of the wavelength range emitted from the IRED 2105 by using a filter passing the light signal of the wavelength range of about 850 nm+/−50 nm including a center wavelength range of the IRED 2105.

In this way, the camera module 291 performs operations for iris recognition without malfunction due to light of nearby another IR wavelength range.

Referring to FIG. 21B, the electronic device 201 may further include an iris recognition camera 2110 for iris recognition in addition to a front camera 2111 to perform iris recognition by using an image 2113 captured through the iris recognition camera 2110 instead of an image 2112 captured through the front camera 2111.

Figure 22:
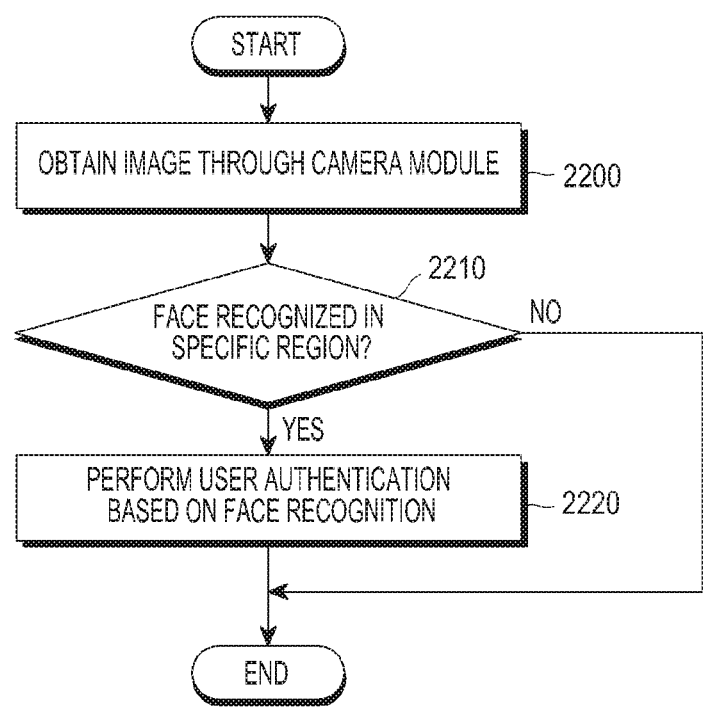
FIG. 22 is a flowchart illustrating a method for determining proximity intention of an external object based on face recognition by using a camera module according to various embodiments of the present disclosure.

FIG. 22 is a flowchart of a method for determining proximity intention of an external object based on face recognition by using a camera module according to various embodiments of the present disclosure. According to various embodiments, operations 2200 to 2220 may be performed by at least one of the electronic device 101, 104, or 201, the server 106, the processor 120 or 210, and the programming module 310.

Referring to FIG. 22, in operation 2200, the electronic device 201 obtains an image through the camera module 291.

In operation 2210, the electronic device 201 determines whether a face is recognized in a specific region in the obtained image, and performs operation 2220 if the face is recognized in the specific region and terminates an operation if the face is not recognized in the specific region.

In operation 2220, the electronic device 201 performs user authentication based on face recognition. For example, if the face is recognized, the electronic device 201 may determine that the proximity intention of the external object is for user authentication. The electronic device 201 extracts characteristics of the recognized face and compares the extracted characteristics of the face with previously stored face characteristics and if the characteristics match each other, the electronic device 201 recognizes the external object as the user of the electronic device 201.

Figure 23:
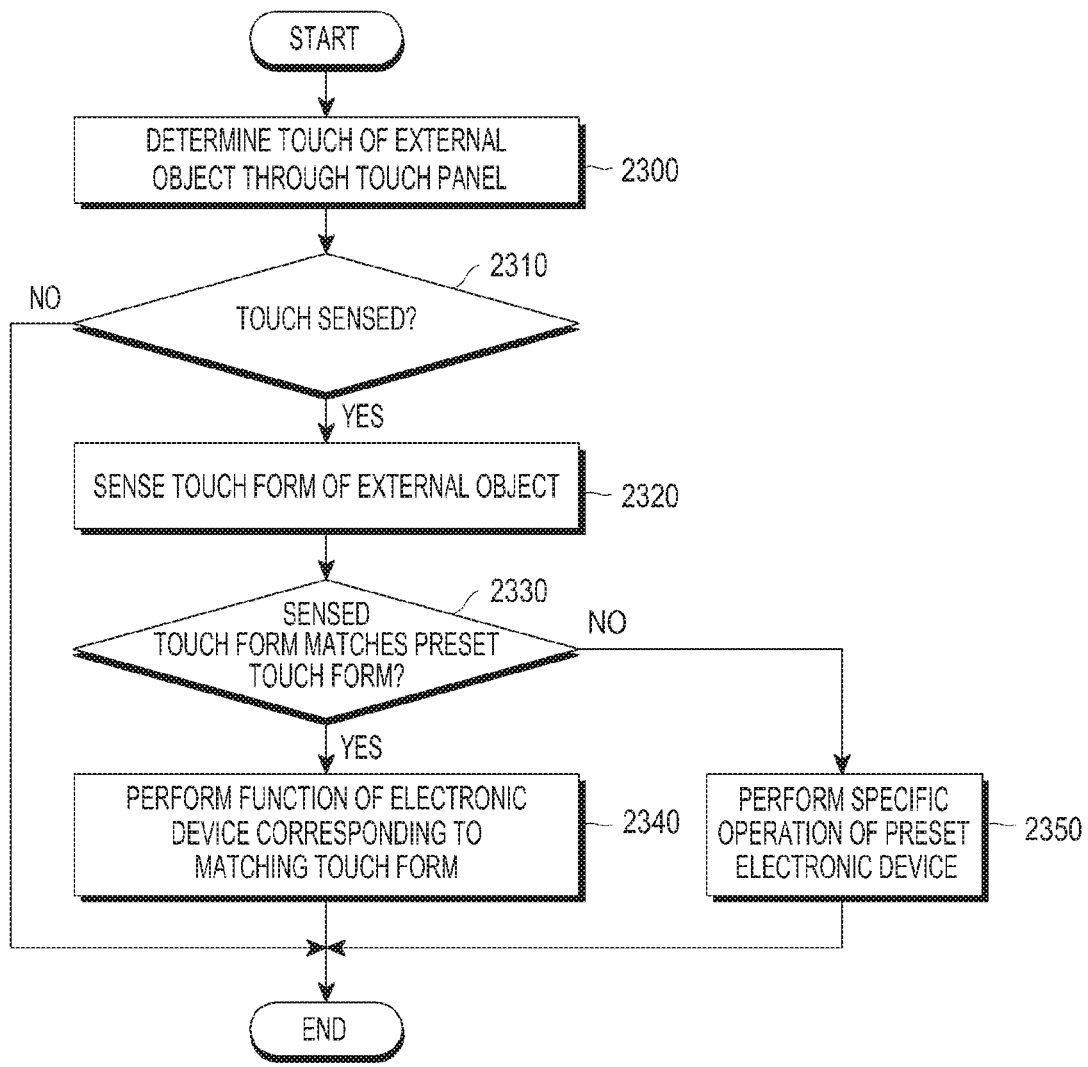
FIG. 23 is a flowchart illustrating a method for determining proximity intention of an external object by using a touch panel according to various embodiments of the present disclosure.

FIG. 23 is a flowchart of a method for determining proximity intention of an external object by using a touch panel according to various embodiments of the present disclosure. According to various embodiments, operations 2300 to 2350 may be performed by at least one of the electronic device 101, 104, or 201, the server 106, the processor 120 or 210, and the programming module 310.

Referring to FIG. 23, in operation 2300, the electronic device 201 determines whether a touch of the external object is sensed through the touch panel 252.

In operation 2310, the electronic device 201 performs operation 2320 if sensing the touch of the external object and terminates an operation if sensing no touch of the external object.

In operation 2320, the electronic device 201 senses a touch form of the external object. For example, the electronic device 201 may sense a holding form in which a user's hand contacts the electronic device 201 by using the touch panel 252, a contact sensor (not shown), the grip sensor 240F, or the like. In another example, if a user's body part approaches the electronic device 201 within a specific region of the electronic device 201 by using the proximity sensor 240G, the electronic device 201 may sense the holding form based on proximity information regarding the user's body part.

In operation 2330, the electronic device 201 determines whether the sensed touch form matches a preset touch form. If the sensed touch form matches the preset touch form, the electronic device 201 performs operation 2340; otherwise, if the sensed touch form does not match the preset touch form, the electronic device 201 performs operation 2350. For example, the electronic device 201 may compare the sensed touch form with a touch form modeled using a plurality of sensors to determine proximity of the external object as proximity for using a function of the electronic device 201 based on whether the sensed touch form matches the modeled touch form. The electronic device 201 compares the sensed touch form with the touch form modeled using the plurality of sensors and determines that the sensed touch form matches the modeled touch form if a difference between the touch forms is less than a threshold value.

In operation 2340, the electronic device 201 performs a function of the electronic device 201, which is set corresponding to the matching touch form. For example, if the touch form corresponds to a call function, the electronic device 201 provides a user interface (UI) for performing the call function of the electronic device 201.

In operation 2350, the electronic device 201 performs a preset function thereof. According to an embodiment, the electronic device 201 may compare the sensed touch form with a touch form modeled using a plurality of sensors to determine that the proximity of the external object is not the proximity for using a function of the electronic device 201 if the sensed touch form does not match the modeled touch form. In this case, the electronic device 201 switches to the sleep mode to reduce current consumption.

FIGS. 24A, 24B, 24C, 24D and 24E illustrate examples for describing a method for performing a function of an electronic device in association with proximity of an external object by using a touch panel according to various embodiments of the present disclosure.

According to various embodiments, the electronic device 201 senses the touch form of the external object by using the touch panel 252, a bezel portion of the electronic device 201, a touch sensor (not shown) on a rear surface of the electronic device 201, the proximity sensor 240G, the grip sensor 240F, or the like.

Figure 24A:
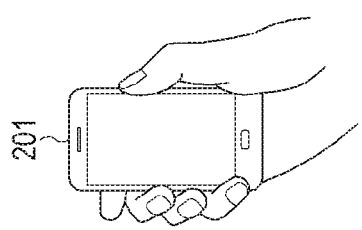
FIGS. 24A, 24B, 24C, 24D and 24E illustrate examples for describing a method for performing a function of an electronic device in association with proximity of an external object by using a touch panel according to various embodiments of the present disclosure.

For example, if the touch form as shown in FIG. 24A is sensed, the electronic device 201 determines that a proximity intention of the external object is for using a function of the electronic device 201, and if the function of the electronic device 201 being set corresponding to the touch form is a clock function, a user interface for performing the clock function may be provided.

Figure 24B:
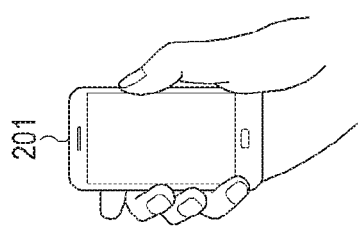

If the touch form as shown in FIG. 24B is sensed, the electronic device 201 determines that the proximity intention of the external object is for using a function of the electronic device 201, and if the function of the electronic device 201 being set corresponding to the touch form is a call function, a user interface for performing the call function may be provided.

Figure 24C:
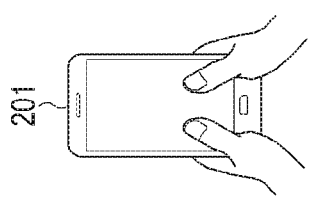

If the touch form as shown in FIG. 24C is sensed, the electronic device 201 determines that the proximity intention of the external object is for using a function of the electronic device 201, and if the function of the electronic device 201 being set corresponding to the touch form is a message transmission/reception function, a user interface for performing the message transmission/reception function may be provided.

Figure 24D:
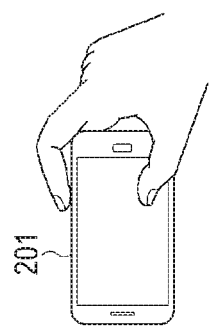

If the touch form as shown in FIG. 24D is sensed, the electronic device 201 determines that the proximity intention of the external object is for using a function of the electronic device 201, and if the function of the electronic device 201 being set corresponding to the touch form is a photographing function, a user interface for performing the photographing function may be provided.

Figure 24E:
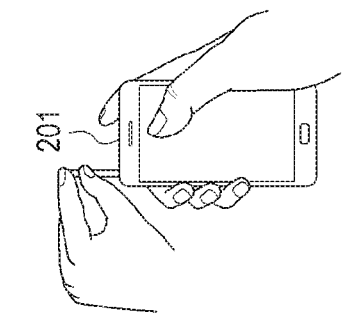

If the touch form as shown in FIG. 24E is sensed, the electronic device 201 determines that the proximity intention of the external object is for using a function of the electronic device 201, and if the function of the electronic device 201 being set corresponding to the touch form is a music play function, a user interface for performing the music play function may be provided.

Figure 25:
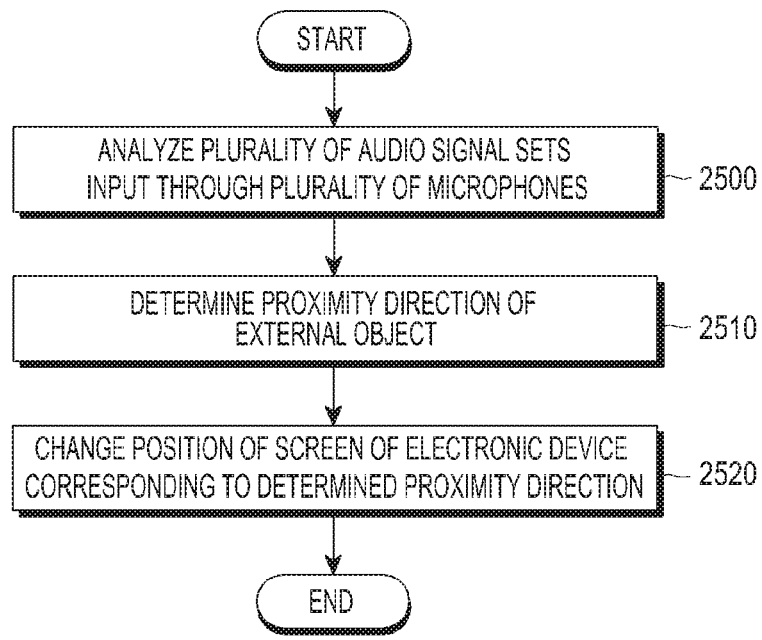
FIG. 25 is a flowchart illustrating a method for performing a function of an electronic device in association with proximity of an external object by using a plurality of microphones according to various embodiments of the present disclosure.

FIG. 25 is a flowchart of a method for performing a function of an electronic device in association with proximity of an external object by using a plurality of microphones according to various embodiments of the present disclosure. According to various embodiments, operations 2500 to 2520 may be performed by at least one of the electronic device 101, 104, or 201, the server 106, the processor 120 or 210, and the programming module 310.

Referring to FIG. 25, in operation 2500, the electronic device 201 analyzes a plurality of audio signal sets input through a plurality of microphones. For example, the electronic device 201 may analyze each of the plurality of audio signal sets to extract audio signals corresponding to footstep sound and analyze the extracted audio signals.

In operation 2510, the electronic device 201 a proximity direction of the external device. For example, the electronic device 201 may analyze the extracted audio signals to calculate an input time difference between the extracted audio signals and determine the proximity direction of the external object by using the calculated input time difference.

In operation 2520, the electronic device 201 changes a screen position of the electronic device 201 in correspondence to the determined proximity direction.

Figures 26A, 26B:
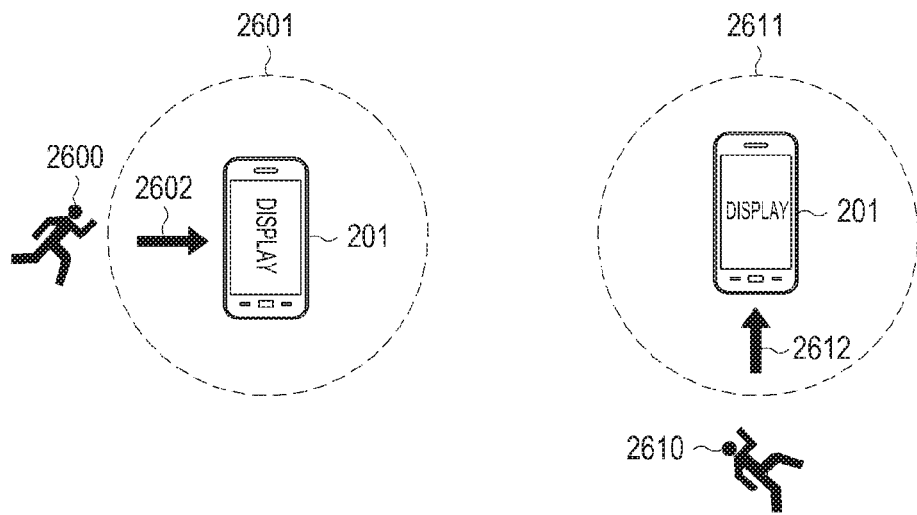
FIGS. 26A and 26B illustrate examples for describing a method for performing a function of an electronic device in association with proximity of an external object by using a plurality of microphones according to various embodiments of the present disclosure.

FIGS. 26A and 26B illustrate examples for describing a method for performing a function of an electronic device in association with proximity of an external object by using a plurality of microphones according to various embodiments of the present disclosure.

Referring to FIG. 26A, the electronic device 201 analyzes respective audio signals input through a plurality of microphones to extract audio signals corresponding to user's footstep sound and senses a magnitude change of the extracted audio signals to determine first proximity of the user. The electronic device 201 determines the user's proximity direction based on an input time difference between the extracted audio signals. For example, if a user 2600 moving in a first proximity direction 2602 in a first proximity region 2601 is sensed, the electronic device 201 may change a direction of a screen displayed on the display 260 to correspond to the first proximity direction 2602.

Referring to FIG. 26B, if the user 2610 moving in a second proximity direction 2612 in a second proximity region 2611 is sensed, the electronic device 201 may change a direction of a screen displayed on the display 260 to correspond to the second proximity direction 2612.

According to various embodiments, the electronic device 201 senses motion of the external object by using the camera module 291, determines proximity of the external object corresponding to the sensed motion, and determines the proximity direction of the external object.

According to various embodiments, the electronic device 201 rotates the screen displayed on the display 260 by 90°, if sensing user's proximity in a vertical side direction of the electronic device 201 in the first proximity region 2602. If sensing user's proximity upward with respect to the electronic device 201 in the first proximity region 2602, the electronic device 201 may rotate the screen displayed on the display 260 by 180°. Thus, the electronic device 201 displays the screen on the display 260 in a direction coinciding with a direction in which the user views.

According to various embodiments, the electronic device 201 changes a size of the screen and displays the screen on the display 260 according to a proximity distance of the external object. For example, the electronic device 201 may enlarge and display the screen on the display 260 if the user is situated in the first proximity region corresponding to a long distance. If the user is situated in the second proximity region corresponding to a short distance, the electronic device 201 may reduce the size of the screen and display the screen on the display 260.

Figure 27:
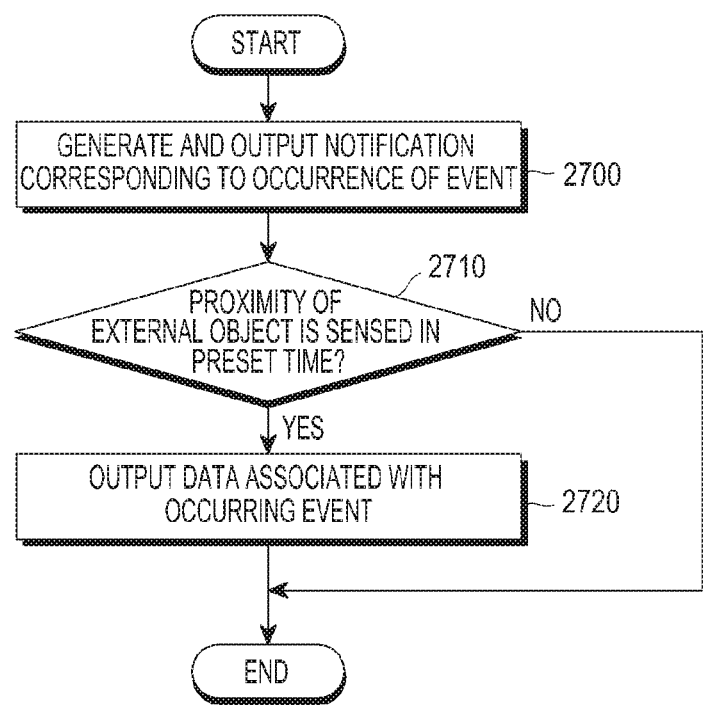
FIG. 27 is a flowchart illustrating a process of sensing proximity of an external object and outputting data corresponding to occurrence of an event according to various embodiments of the present disclosure.

FIG. 27 is a flowchart of a process of sensing proximity of an external object and outputting data corresponding to occurrence of an event according to various embodiments of the present disclosure. According to various embodiments, operations 2700 to 2720 may be performed by at least one of the electronic device 101, 104, or 201, the server 106, the processor 120 or 210, and the programming module 310.

Referring to FIG. 27, in operation 2700, the electronic device 201 generates a notification corresponding to occurrence of an event and outputs the generated notification. For example, upon receiving a message, the electronic device 201 may generate and output a message reception notification.

In operation 2710, the electronic device 201 determines whether proximity of an external object is sensed within a preset time. If the proximity of the external object is sensed within the preset time, the electronic device 201 performs operation 2720; otherwise, if the proximity of the external object is not sensed within the preset time, the electronic device 201 terminates an operation.

In operation 2720, the electronic device 201 outputs data associated with the occurring event.

For example, the electronic device 201 may monitor proximity of the external object and load and output data (or an application) associated with a message if sensing the proximity of the external object. The proximity of the external object may include a case where the external object is located in a proximity region such as the first proximity region, the second proximity region, or a hovering sensing region or contacts the electronic device 201. According to another embodiment, the electronic device 201 outputs data associated with the occurring event if sensing motion of the external object.

Thus, the user approaching the electronic device 201 does not need to perform an operation for switching to a message screen to read a received message, and thus may immediately check data associated with the message without a delay.

According to an embodiment, the electronic device 201 may further request user authentication after determining user's proximity. For example, the electronic device may output data associated with a message based on a user's authentication result in response to the authentication request (e.g., log-in, a password, a pattern lock, etc.).

For example, upon receiving a notification associated with a game from a game server, the electronic device 201 may output the received notification, monitor proximity of the external object, and execute and output an application associated with the game upon sensing the proximity of the external object.

Figure 28:
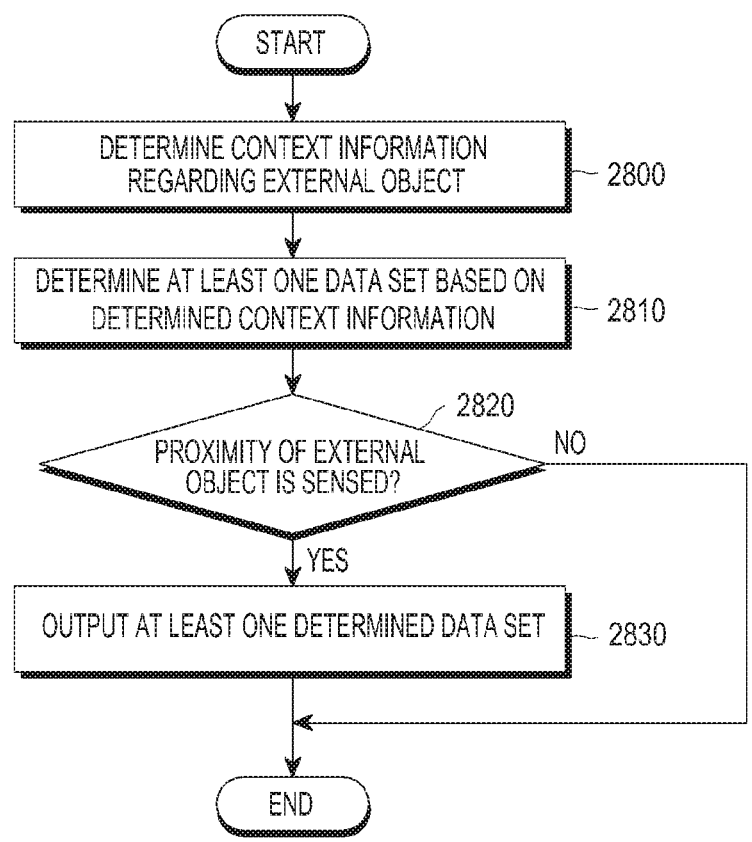
FIG. 28 is a flowchart illustrating a process of sensing proximity of an external object and outputting data corresponding to context information according to various embodiments of the present disclosure.

FIG. 28 is a flowchart of a process of sensing proximity of an external object and outputting data corresponding to context information according to various embodiments of the present disclosure. According to various embodiments, operations 2800 to 2830 may be performed by at least one of the electronic device 101, 104, or 201, the server 106, the processor 120 or 210, and the programming module 310.

Referring to FIG. 28, in operation 2800, the electronic device 201 determines context information regarding the external object. For example, the electronic device 201 may collect context information associated with the user if the user of the electronic device 201 is designated. The context information associated with the user may be determined based on time, location, and motion information regarding the user.

In operation 2810, the electronic device 201 determines at least one data set based on the determined context information. For example, the electronic device 201 may determine a data set to be provided to the user based on the collected context information.

In operation 2820, the electronic device 201 determines whether proximity of an external object is sensed. If the proximity of the external object is sensed, the electronic device 201 performs operation 2830; otherwise, if the proximity of the external object is not sensed, the electronic device 201 terminates an operation.

In operation 2830, the electronic device 201 outputs the at least one determined data set.

According to an embodiment, the electronic device 201 obtains user's proximity information or motion information by using at least some of a plurality of sensors and determines user's context information by associating the obtained proximity information or motion information with current time and location information. The motion information may include a pattern in which the user moves.

For example, if the current time is weekday morning time, the user is situated at home, and the motion pattern of the user matches a specific motion pattern, then the electronic device 201 may determine that the user is preparing for going to work or going out. For example, if the current time is weekend night time, the user is situated at home, and the motion of the user is less than threshold motion, then the electronic device 201 may determine that the user is sleeping.

Based on the determined context information of the user, the electronic device 201 determines at least one data set to be provided to the user. If the user's context information indicates preparation for going to work or going out, the electronic device 201 may sense user's proximity and if sensing user's proximity, the electronic device 201 may load and output data (or an application) associated with 'today weather' or data (or an application) associated with 'traffic condition'.

Thus, the user does not need to perform an additional operation for being provided with a proper function or proper information according to a user's condition, such that the user may immediately check associated data without a delay.

Figure 29:
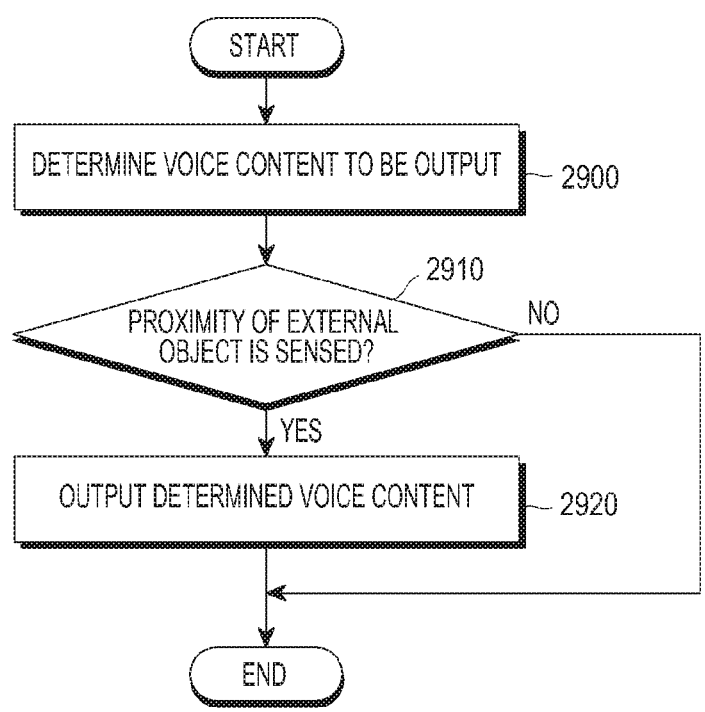
FIG. 29 is a flowchart illustrating a process of sensing proximity of an external object and outputting voice content according to various embodiments of the present disclosure.

FIG. 29 is a flowchart of a process of sensing proximity of an external object and outputting voice content according to various embodiments of the present disclosure. According to various embodiments, operations 2900 to 2920 may be performed by at least one of the electronic device 101, 104, or 201, the server 106, the processor 120 or 210, and the programming module 310.

According to various embodiments, the electronic device 201 senses proximity of the external object, outputs voice content if the external object is situated in a proximity region and stops outputting the voice content if the external object is out of the proximity region.

Referring to FIG. 29, in operation 2900, the electronic device 201 determines voice information to be output. For example, the voice content may include news content, weather content, and so forth.

In operation 2910, the electronic device 201 determines whether proximity of an external object is sensed. If the proximity of the external object is sensed, the electronic device 201 performs operation 2920; otherwise, if the proximity of the external object is not sensed, the electronic device 201 determines proximity of the external object in operation 2910.

In operation 2920, the electronic device 201 outputs the determined voice content.

According to an embodiment, the electronic device 201 determines voice content to be output to the user and determines user's first proximity or second proximity to output the determined voice content. For example, the electronic device 201 may determine whether the user is situated in the first proximity region or the second proximity region. If sensing the user's first proximity or second proximity, the electronic device 201 plays and outputs the voice content. In another example, the electronic device 201 outputs a voice signal asking user's acceptance or rejection for playing the voice content, and then plays the voice content if receiving a voice signal corresponding to the user's acceptance.

Figure 30B:
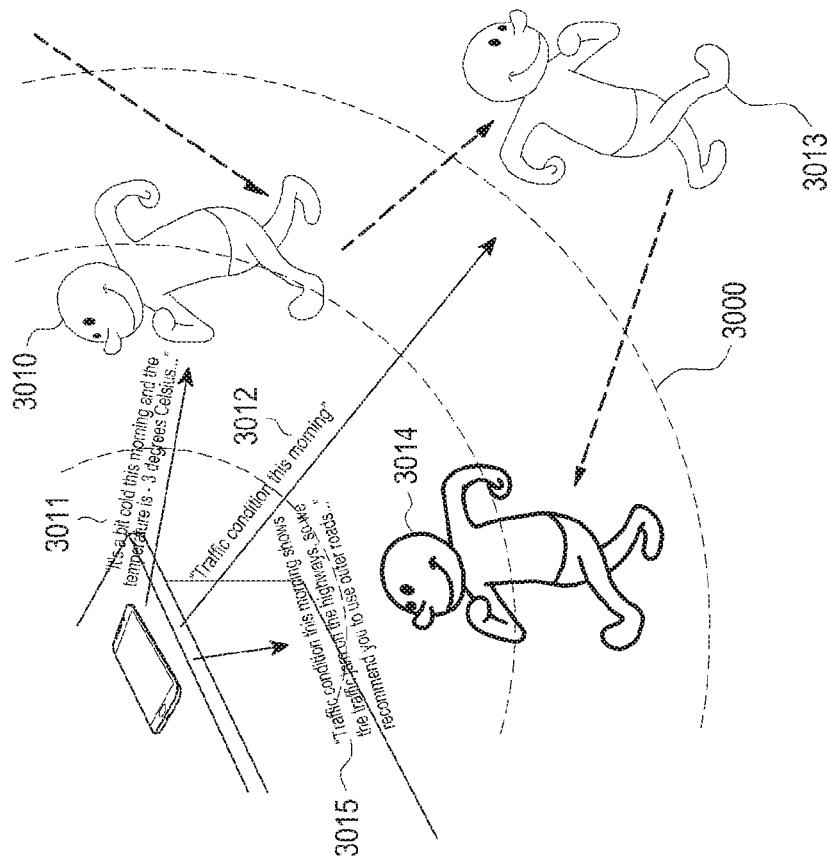
FIGS. 30A and 30B illustrate examples for describing an operation of sensing proximity of an external object and outputting voice content according to various embodiments of the present disclosure.
Figure 30A:
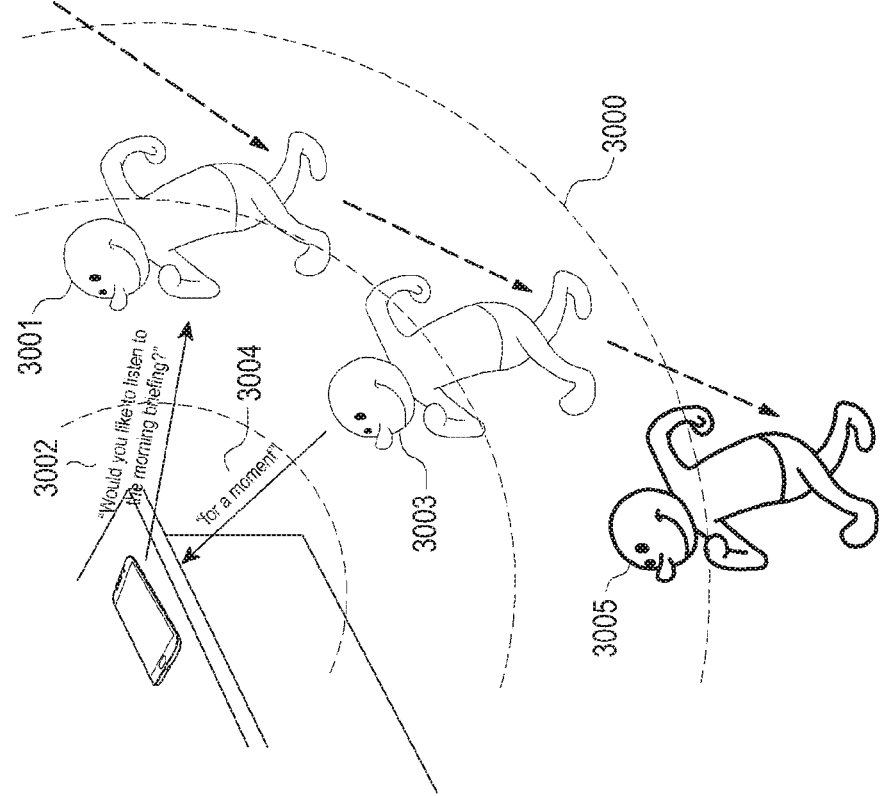

FIGS. 30A and 30B illustrate examples for describing an operation of sensing proximity of an external object and outputting voice content according to various embodiments of the present disclosure.

Referring to FIG. 30A, if sensing a user 3001 entering a proximity region 3000, the electronic device 201 outputs a voice signal 3002 asking whether to accept outputting the voice content like "Would you like to listen to the morning briefing?". If a voice signal indicating acceptance for playing the voice content like "Yes" is input from the user, the electronic device 201 outputs the voice content. If a voice signal 3004 indicating stopping playing the voice content like "for a moment" is input from a user 3003 located in the proximity region 3000, the electronic device 201 stops outputting the voice content. If a user 3005 is located outside the proximity region 3000, the electronic device 201 stops playing the voice content and continuously determines whether the user is sensed within the proximity region 3000.

Referring to FIG. 30B, if sensing the user 3010 entering the proximity region 3000, the electronic device 201 plays voice content 3011 like "It's a bit cold this morning and the temperature is −3 degrees Celsius . . . ". If a user 3013 is located outside the proximity region 3000, the electronic device 201 temporarily stops outputting voice content 3012 that has been played like "Traffic condition this morning". The electronic device 201 continuously determines whether the user is located in the proximity region 3000, and if sensing a user 3014 again in the proximity region 3000, the electronic device 201 plays again the stopped voice content and outputs voice content 3015 like "Traffic condition this morning shows the traffic jam on the highways, so we recommend you to use outer roads . . . ".

According to various embodiments, if a preset condition is satisfied, the electronic device 201 initializes the camera module 291 and switches the camera module 291 to the sleep mode. If receiving a first input, the electronic device 201 switches the camera module 291 from the sleep mode to an operation mode. For example, if determining that the external object is located within the second proximity region, the electronic device 201 may initialize the camera module 291 and switch the camera module 291 to the sleep mode. If performing user authentication or sensing detailed proximity of the user for determining a proximity intention, the electronic device 201 may switch the camera module 291 from the sleep mode to the operation mode. Thus, the user may use the camera module 291 faster than when an operation for operating the camera module 291 is performed by user's selection.

According to an embodiment, the electronic device 201 supplies power to at least a part of the camera module 291 for initializing the camera module 291. For example, the electronic device 201 may deliver at least one of a program for operating at least a part of the camera module 291 and configuration information of the camera module 291 to the at least a part of the camera module 291. As a result, the at least a part of the camera module 291 may be switched to an inoperable state to an operable state after the program is executed.

According to an embodiment, the electronic device 201 stores a program (e.g., firmware, etc.) for operating at least a part of the camera module to initialize the camera module 291 in an internal memory (e.g., a first memory, a second memory, and/or a third memory) of the camera module. For example, the electronic device 201 may deliver a configuration value for the at least a part of the camera module 291 to the at least a part of the camera module 291 or store the configuration value in an internal memory of the camera module 291. The program may apply configuration values to the at least a part of the camera module 291 or generate or correct an image/data associated with the image according to the configuration values. The configuration values of the camera module 291 may include at least one of an international standardization organization (ISO) configuration value, a white balance (WB)/AWB configuration value, a frame rate, a capture resolution, a preview resolution, a preview format configuration value, an automatic exposure (AE) configuration value, an autofocus (AF) configuration value, a noise reduction configuration value, a resizing/scaling configuration value, a color space conversion (CSC) configuration value, a gamma correction configuration value, a PAF configuration value, an HDRI configuration value, allocation information of a partial region of a memory for processing an input image, and so forth.

Figure 31:
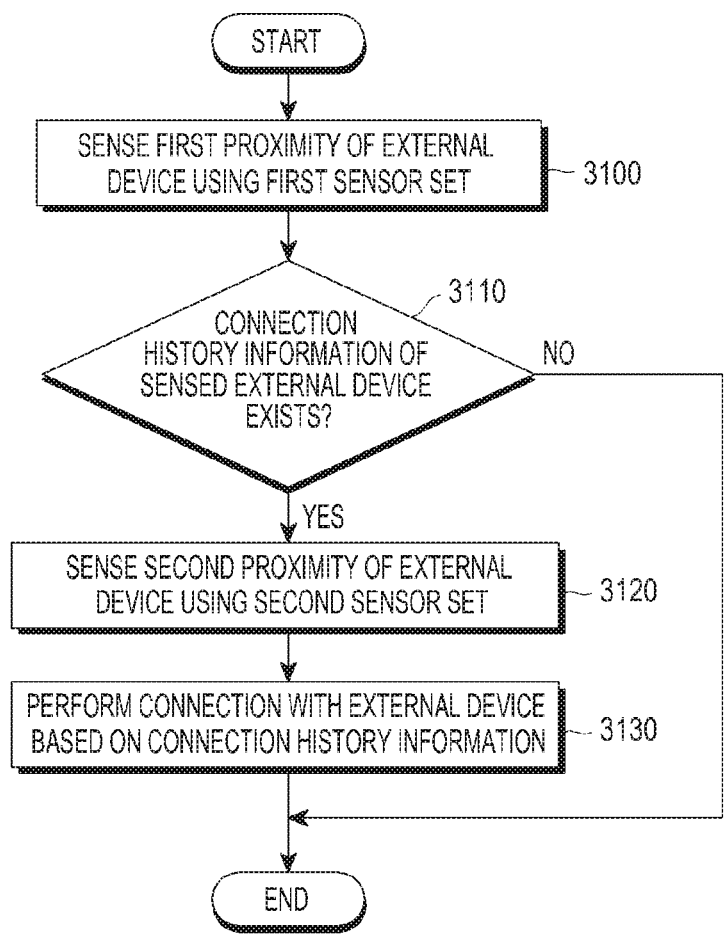
FIG. 31 illustrating a flowchart of an operation of sensing proximity of an external device and performing connection with an external device based on connection history information according to various embodiments of the present disclosure.

FIG. 31 is a flowchart of an operation of sensing proximity of an external device and performing connection with an external device based on connection history information according to various embodiments of the present disclosure. According to various embodiments, operations 3100 to 3130 may be performed by at least one of the electronic device 101, 104, or 201, the server 106, the processor 120 or 210, and the programming module 310.

Referring to FIG. 31, in operation 3100, the electronic device 201 senses first proximity of an external device by using a first sensor set. For example, the electronic device 201 may determine whether the external object is located in the first proximity region, by sensing a beacon signal output from the external device through the RF module 229.

In operation 3110, the electronic device 201 determines whether connection history information of the sensed external device exists. If the connection history information exists, the electronic device 201 performs operation 3120; otherwise, if the connection history information does not exist, the electronic device 201 terminates the operation.

In operation 3120, the electronic device 201 senses second proximity of the external object by using a second sensor set. For example, the electronic device 201 may determine whether the external object is located in the second proximity region, by sensing a beacon signal output from the external device through the RF module 229.

In operation 3130, the electronic device 201 performs connection with the external device based on the connection history information of the external device. For example, if connection history information with an external device the user carries or wears exists, the electronic device 201 may activate communication functions having a history of connection with the external device by using the connection history information, and connects to the external device by using the activated communication functions.

According to various embodiments, if the external device being connected is not located in a specific region, the electronic device 201 terminates connection with the external device and resumes connection with the external device if sensing that the external device is located in the specific region.

According to various embodiments, if the external device is located in the specific region, the electronic device 201 activates a communication function for connection with the external device, and unless the external device is not located in the specific region, the electronic device 201 deactivates the communication function to reduce unnecessary battery consumption.

According to various embodiments, if the registered external device is connected again, the electronic device 201 replaces the connection with a third proximity state or user authentication. For example, if the registered external device approaches and is connected again and the external device enters the second proximity distance, the electronic device 201 may skip user authentication and output a message or unlock screen.

According to various embodiments, the electronic device 201 senses first proximity of the external object by using at least some of a plurality of sensors and determines a motion pattern or moving path of the sensed external object. If the determined motion pattern or moving path of the external object is not proximity of the external object for using a function of the electronic device 201, the electronic device 201 may not perform an operation for sensing second proximity of the external object.

According to various embodiments, the electronic device 201 determines first proximity, second proximity, detailed proximity, and so forth of the external object by using at least one electronic device (e.g., an access point (AP), a TV, an illumination, and so forth) functionally connected to the electronic device 201.

As is apparent from the foregoing description, according to various embodiments of the present disclosure, a service meeting user's demands may be actively provided to the user, and an electronic device's function desired by the user may be rapidly performed.

As is apparent from the foregoing description, according to various embodiments of the present disclosure, a service meeting user's demands may be actively provided to the user, and an electronic device's function desired by the user may be rapidly performed.

A term "module" used herein may mean, for example, a unit including one of or a combination of two or more of hardware, software, and firmware. The "module" may be interchangeably used with a unit, a logic, a logical block, a component, or a circuit. The "module" may be a minimum unit or a portion of an integrated component. The "module" may be a minimum unit or a portion thereof performing one or more functions. The "module" may be implemented mechanically or electronically. For example, the "module" according to the embodiments may include at least one of an application-specific integrated circuit (ASIC) chip, field-programmable gate arrays (FPGAs), and a programmable-logic device performing certain operations already known or to be developed.

At least a part of an apparatus (e.g., modules or functions thereof) or a method (e.g., operations) according to various embodiments may be implemented with a command stored in a computer-readable storage medium in the form of a programming module. When the instructions are executed by one or more processors (for example, the processor 120), the one or more processors may perform functions corresponding to the instructions. The computer-readable storage medium may be, for example, a memory included in the memory 130.

The computer readable recording medium includes hard disk, floppy disk, or magnetic media (e.g., a magnetic tape, optical media (e.g., compact disc read only memory (CD-ROM) or digital versatile disc (DVD), magneto-optical media (e.g., floptical disk), a hardware device (e.g., ROM, RAM, flash memory, etc.), and so forth. Further, the program instructions include a machine language code created by a complier and a high-level language code executable by a computer using an interpreter. The foregoing hardware device may be configured to be operated as at least one software module to perform an operation of the present disclosure, or vice versa.

Modules or programming modules according to various embodiments of the present disclosure may include one or more of the foregoing elements, have some of the foregoing elements omitted, or further include additional other elements. Operations performed by the modules, the programming modules or other elements according to various embodiments may be executed in a sequential, parallel, repetitive or heuristic manner. Also, some of the operations may be executed in different order or omitted, or may have additional different operations.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An electronic device comprising:
a touchscreen display; and
a processor configured to:
detect, via a first sensor of the electronic device, a voice signal,
identify whether a user is located within a predetermined range with respect to the electronic device based on the detected voice signal,
in response to identifying that the user is located within the predetermined range with respect to the electronic device based on the voice signal,
identify, via a second sensor of the electronic device, whether the electronic device is inclined while the electronic device is in a sleep mode,
in response to identifying that the electronic device is inclined while the electronic device is in the sleep mode, switch an operation mode of the electronic device from the sleep mode to an active mode and display, a lock screen for authentication of the user on the touchscreen display in the active mode, wherein identifying that the electronic device is inclined includes identifying a change of an orientation of the touchscreen display from a substantially horizontal orientation to a substantially vertical orientation with respect to a ground,
identify, via a third sensor of the electronic device, a face of the user while the lock screen for authentication of the user is displayed on the touchscreen display, and
display a unlock screen on the touchscreen display when the user is authenticated based on identifying the face of the user,
wherein the first sensor, the second sensor, and the third sensor are different sensors than each other.

2. The electronic device of claim 1, wherein the second sensor includes at least one of a gyro sensor and an acceleration sensor.

3. The electronic device of claim 1, wherein the third sensor includes at least one camera.

4. The electronic device of claim 1, wherein the processor is further configured to display the lock screen based on a speed of changing the orientation of the touchscreen display.

5. A method for controlling an electronic device, the method comprising:
detecting, via a first sensor of the electronic device, a voice signal;
identifying whether a user is located within a predetermined range with respect to the electronic device based on the detected voice signal;
in response to identifying that the user is located within the predetermined range with respect to the electronic device based on the voice signal, identifying, via a second sensor of the electronic device, whether the electronic device is inclined while the electronic device is in a sleep mode;
in response to identifying that the electronic device is inclined while the electronic device is in the sleep mode, switching an operation mode of the electronic device from the sleep mode to an active mode and displaying a lock screen for authentication of a user on a touchscreen display of the electronic device in the active mode, wherein identifying that the electronic device is inclined includes identifying a change of an orientation of the touchscreen display from a substantially horizontal orientation to a substantially vertical orientation with respect to a ground;

identifying, via a third sensor of the electronic device, a face of the user while the lock screen for authentication of the user is displayed on the touchscreen display; and displaying a unlock screen on the touchscreen display when the user is authenticated based on identifying the face of the user, wherein the first sensor, the second sensor, and the third sensor are different sensors than each other.

6. The method of claim 5, wherein the second sensor includes at least one of a gyro sensor and an acceleration sensor.

7. The method of claim 5, wherein the third sensor includes at least one camera.

8. The method of claim 5, wherein displaying the lock screen comprises displaying the lock screen based on a speed of changing the orientation of the touchscreen display.

* * * * *